US012795214B2

(12) United States Patent
Maze et al.

(10) Patent No.: US 12,795,214 B2
(45) Date of Patent: Nov. 10, 2026

(54) METHOD, DEVICE, AND COMPUTER PROGRAM FOR IMPROVING INDEXING, FILTERING, AND REPAIRING OF PORTIONS OF ENCAPSULATED MEDIA DATA

(71) Applicant: CANON KABUSHIKI KAISHA, Tokyo (JP)

(72) Inventors: Frédéric Maze, Langan (FR); Franck Denoual, Saint Domineuc (FR); Naël Ouedraogo, Val D'anast (FR); Lionel Tocze, Saint Domineuc (FR); Jean Le Feuvre, Gometz-le-Chatel (FR)

(73) Assignee: CANON KABUSHIKI KAISHA, Tokyo (JP)

( * ) Notice: Subject to any disclaimer, the term of this patent is extended or adjusted under 35 U.S.C. 154(b) by 20 days.

(21) Appl. No.: 18/767,769

(22) Filed: Jul. 9, 2024

(65) Prior Publication Data

US 2025/0024119 A1 Jan. 16, 2025

(30) Foreign Application Priority Data

Jul. 10, 2023 (GB) ..................................... 2310589
Oct. 9, 2023 (GB) ..................................... 2315480

(51) Int. Cl.
*H04N 21/84* (2011.01)
*H04N 21/854* (2011.01)

(52) U.S. Cl.
CPC ....... *H04N 21/84* (2013.01); *H04N 21/85406* (2013.01)

(58) Field of Classification Search
None
See application file for complete search history.

(56) References Cited

U.S. PATENT DOCUMENTS

2015/0110473 A1* 4/2015 Wang .................. H04N 19/597 386/341
2018/0109817 A1* 4/2018 Wang ............... H04N 21/85406
2020/0260063 A1* 8/2020 Hannuksela ... H04N 21/234345
2022/0335978 A1 10/2022 Kondrad

FOREIGN PATENT DOCUMENTS

GB 2516826 A * 2/2015 ......... H04N 21/4728

* cited by examiner

*Primary Examiner* — Cai Y Chen
(74) *Attorney, Agent, or Firm* — Canon U.S.A., Inc. IP Division

(57) ABSTRACT

At least one embodiment of a method for encapsulating media data in a media file, the media data comprising a plurality of samples. After having generated a first track comprising a media data part storing a first sequence of samples of the plurality of samples, the first track further comprising a metadata part describing the first sequence of samples and having generated descriptive metadata describing a dependency between a given sample of the first track and another sample, the generated descriptive metadata being stored in the metadata part of the first track, the first track is encapsulated in the media file, the generated descriptive metadata comprising an offset reference for indicating a reference sample to be used for identifying the sample the given sample depends on.

24 Claims, 6 Drawing Sheets

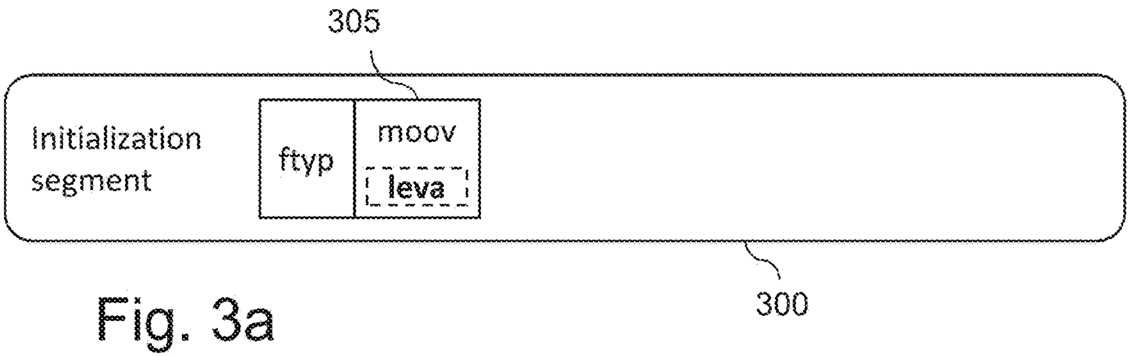

Fig. 3a

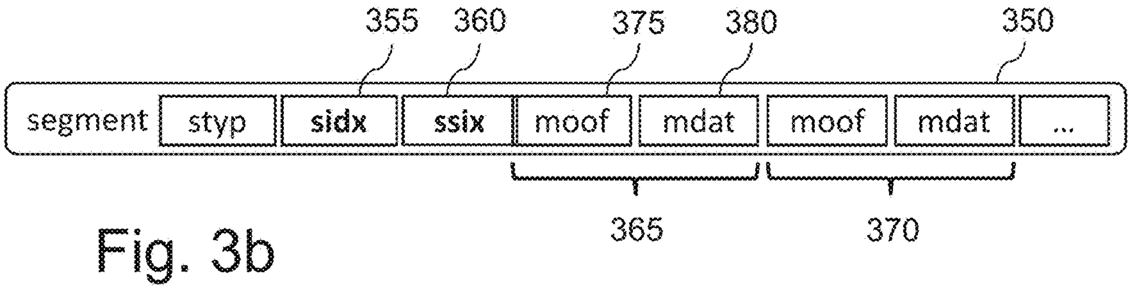

Fig. 3b

```
class SampleDependencyGroupEntry extends
SampleGroupDescriptionEntry ('sdep')
{
   unsigned int(16) num_dependencies;         // intra-track
   unsigned int(16) num_inter_dependencies; // inter-track
   unsigned int(16) depended_sample_num_diff [num_dependencies]; // dsd[]
   for (i=0; i < num_inter_dependencies; i++){
        unsigned int(32) ref_track_index;
        unsigned int(16) depended_inter_sample_num_diff; // disdi

   }
}
```

400

Fig. 4a

METHOD, DEVICE, AND COMPUTER PROGRAM FOR IMPROVING INDEXING, FILTERING, AND REPAIRING OF PORTIONS OF ENCAPSULATED MEDIA DATA

CROSS REFERENCE TO RELATED APPLICATION

This application claims the benefit under 35 U.S.C. § 119 (a)-(d) of United Kingdom Patent Application No. 2310589.3, filed on Jul. 10, 2023 and entitled "Method, device, and computer program for improving indexing, filtering, and repairing of portions of encapsulated media data" and United Kingdom Patent Application No. 2315480.0, filed on Oct. 9, 2023 and entitled "Method, device, and computer program for improving indexing, filtering, and repairing of portions of encapsulated media data". The above cited patent applications are incorporated herein by reference in their entirety.

FIELD OF THE DISCLOSURE

The present invention relates to a method, a device, and a computer program for improving encapsulating, parsing, filtering, and repairing of media data, making it possible to improve the indexing, filtering, repairing, and transmission of portions of encapsulated media data for allowing the reconstruction of a valid media file from the filtered or repaired portions of encapsulated media data.

BACKGROUND OF THE DISCLOSURE

The disclosure relates to encapsulating, parsing, streaming, filtering, and repairing media data, e.g. according to ISO Base Media File Format (ISOBMFF) as defined by the MPEG standardization organization, to provide a flexible and extensible format that facilitates interchange, management, editing, and presentation of groups of media data or bit-streams and to improve its delivery for example over an IP (Internet Protocol) network such as the Internet using adaptive HTTP (Hypertext Transfer Protocol) streaming protocol.

The International Standard Organization Base Media File Format (ISOBMFF, ISO/IEC 14496-12) is a well-known flexible and extensible format that describes the encapsulation of timed media data or bit-streams either for local storage or transmission via a network or via another bit-stream delivery mechanism. The timed media data may represent encoded media data. This file format has several extensions, e.g. Part-15, ISO/IEC 14496-15 that describes encapsulation tools for various NAL (Network Abstraction Layer) unit-based video encoding formats. Examples of such encoding formats are AVC (Advanced Video Coding), SVC (Scalable Video Coding), HEVC (High Efficiency Video Coding), L-HEVC (Layered HEVC), or VVC (Versatile Video Coding). Other examples of file format extensions are ISO/IEC 23090-18 for carriage of Geometry-based Point Cloud Compression (G-PCC), ISO/IEC 23090-10 for carriage of Visual Volumetric Video-based Coding (V3C) Data, or Video-based Dynamic Mesh Coding (V-DMC). ISOBMFF is object-oriented. It is composed of building blocks called boxes (also denoted objects, atoms, structure-data, or data structures, each of which being identified by a four character code) that are sequentially or hierarchically organized and that define descriptive parameters of the timed media data or bit-stream such as timing and structure parameters. In the file format, the overall presentation over time is called a movie. The movie is described by a movie box (with four character code 'moov') at the top level of the media or presentation file. This movie box represents an initialization information container containing a set of various boxes describing the presentation. It may be logically divided into tracks represented by track boxes (with four character code 'trak'). Each track (uniquely identified by a track identifier (track_ID)) represents a timed sequence of media data pertaining to the presentation (frames of video, timed metadata, or audio samples, for example). Within each track, each timed unit of media data is called a sample, which may be a video frame, an audio sample, or a set of timed metadata. In other words, a sample of the track represents all the media data associated with a single time in the track. Samples are implicitly numbered in sequence. The actual sample data are in boxes called Media Data boxes (with four character code 'mdat') or Identified Media Data boxes (with four character code 'imda') at the same level as the movie box. The movie may also be fragmented, i.e. organized temporally as a movie box containing information for the whole presentation followed by a list of movie fragment and Media Data box pairs or a list of movie fragments and Identified Media Data box pairs. Within a movie fragment (box with four-character code 'moof') there is a set of track fragments (box with four character code 'traf'), zero or more per movie fragment. The track fragments in turn contain zero or more track run boxes ('trun'), each of which documents a contiguous run of samples for that track fragment.

Media data encapsulated with ISOBMFF can be used for adaptive streaming with HTTP. For example, MPEG DASH (for "Dynamic Adaptive Streaming over HTTP"), HTTP Live Streaming (HLS), and Smooth Streaming are well-known HTTP adaptive streaming protocols enabling segments or fragment-based delivery of media files. The MPEG DASH standard (see "ISO/IEC 23009-1, Dynamic adaptive streaming over HTTP (DASH), Part1: Media presentation description and segment formats") makes it possible to establish a link between a compact description of the content(s) of a media presentation and the HTTP addresses. Usually, this association is described in a file called a manifest file or description file. In the context of DASH, this manifest file is a file also called the MPD file (for Media Presentation Description). When a client device gets the MPD file, the description of each encoded and deliverable version of a media content component (representing a single continuous encapsulated timed media data) can easily be determined by the client. By reading or parsing the manifest file, the client is aware of the kind of media content components proposed in the media presentation and is aware of the HTTP addresses for downloading the associated media content components. Therefore, it can decide which media content components to download (via HTTP requests) and to play (decoding and playing after reception of the segments). DASH defines several types of segments, mainly initialization segments, media segments, or index segments. Initialization segments contain setup information and metadata describing the media content component, typically at least the 'ftyp' and 'moov' boxes of an ISOBMFF media file. A media segment contains the media data corresponding to a media content component. It can be for example one or more 'moof' plus 'mdat' or 'imda' boxes of an ISOBMFF file or a byte range in the 'mdat' or 'imda' box of an ISOBMFF file. A media segment may be further subdivided into sub-segments (also corresponding to one or more complete 'moof' plus 'mdat' or 'imda' boxes). The DASH manifest may provide segment URLs or a base URL to the file with byte ranges to segments for a streaming client to address these segments through HTTP requests. The byte range information of portions of an ISOBMFF media file or a media segment may be provided by specific ISOBMFF boxes such as the Segment Index box ‘sidx’ or the SubSegment Index box ‘ssix’. These boxes can be present in an index segment or in a media segment.

While these file formats and these methods for transmitting media data have proven to be efficient, there is a continuous need to improve selection of the data to be sent to a client and to improve the description of the indexation allowing a client, a reader, or a file parser to exploit, filter, or repair portions of the data, e.g., to reconstruct a valid media file compliant with these file formats.

SUMMARY OF THE INVENTION

The present disclosure has been devised to address one or more of the foregoing concerns.

According to a first aspect of the disclosure, there is provided a method of encapsulating media data in a media file, in a processing device, the media data comprising a plurality of samples, the method comprising:

- generating a first track comprising a media data part storing a first sequence of samples of the plurality of samples, the first track further comprising a metadata part describing the first sequence of samples,
- generating descriptive metadata describing a dependency between a given sample of the first track and another sample, the generated descriptive metadata being stored in the metadata part of the first track, and
- encapsulating the first track in the media file, wherein the generated descriptive metadata comprise an offset reference for indicating a reference sample to be used for identifying the sample the given sample depends on.

Accordingly, the method of the disclosure makes it possible to improve streaming of media data, in particular low-latency streaming of media data, and to assist a client or parser to determine whether samples should be repaired or canceled in case of loss of samples. The method according to the disclosure is independent from the coding type and gives a complete description of sample dependencies.

According to some embodiments, the offset reference indicates whether the sample the given sample depends on is identified according to an offset from the given sample or according to a previously identified reference sample.

Still according to some embodiments, the generated descriptive metadata comprise an offset to the other sample relative to the given sample.

Still according to some embodiments, the method further comprises generating a second track comprising a media data part storing a second sequence of samples of the plurality of samples, the generated descriptive metadata describing a dependency between a given sample of the first track and a sample of the second track.

Still according to some embodiments, the generated descriptive metadata comprise a reference to the second track and an offset to the sample of the second track relative to a sample of the second track temporally corresponding to the given sample.

Still according to some embodiments, the generated descriptive metadata describes a group of samples, a sample of the first track that depends on another sample being associated with the described group of samples.

Still according to some embodiments, the generated descriptive metadata further comprises a number of samples, per track, on which a given sample of the first track depends.

Still according to some embodiments, the generated descriptive metadata further described a byte-range comprising the first sequence of samples.

Still according to some embodiments, the generated descriptive metadata further comprise an indicator indicating that the given sample depends on a same sample a previous sample depends on.

Still according to some embodiments, the media file is an ISOBMFF media file.

According to a second aspect of the disclosure, there is provided a method for processing a media file encapsulating media data, in a processing device, the media data comprising a plurality of samples, the method comprising:

- obtaining descriptive metadata of a meta data part of a first track encapsulated in the media file, the first track further comprising a media data part storing a first sequence of samples of the plurality of samples, the obtained descriptive metadata describing a dependency between a given sample of the first track and another sample,
- processing the given sample as a function of the described dependency wherein the obtained descriptive metadata comprise an offset reference for indicating a reference sample to be used for identifying the sample the given sample depends on.

Accordingly, the method of the disclosure makes it possible to improve streaming of media data, in particular low-latency streaming of media data, and to assist a client or parser to determine whether samples should be repaired or canceled in case of loss of samples. The method according to the disclosure is independent from the coding type and gives a complete description of sample dependencies.

According to some embodiments, the offset reference indicates whether the sample the given sample depends on is identified according to an offset from the given sample or according to a previously identified reference sample.

Still according to some embodiments, the obtained descriptive metadata comprise an offset to the other sample relative to the given sample.

Still according to some embodiments, the media file comprises a second track, the second track comprising a media data part storing a second sequence of samples of the plurality of samples, the obtained descriptive metadata describing a dependency between a given sample of the first track and a sample of the second track.

According to some embodiments, the obtained descriptive metadata comprise a reference to the second track and an offset to the sample of the second track relative to a sample of the second track temporally corresponding to the given sample.

Still according to some embodiments, the obtained descriptive metadata describes a group of samples, a sample of the first track that depends on another sample being associated with the described group of samples.

Still according to some embodiments, the obtained descriptive metadata further described a byte-range comprising the first sequence of samples.

Still according to some embodiments, processing a given sample depending on another sample comprises filtering samples.

Still according to some embodiments, processing a given sample depending on another sample comprises repairing a damage or partially lost byte range of the media file.

Still according to some embodiments, the obtained descriptive metadata further comprise an indicator indicating that the given sample depends on a same sample a previous sample depends on.

Still according to some embodiments, the media file is an ISOBMFF media file.

According to other aspects of the disclosure, there is provided a processing device comprising a processing unit configured for carrying out each step of the methods described above. The other aspects of the present disclosure have optional features and advantages similar to the first and second above-mentioned aspects.

At least parts of the methods according to some embodiments of the disclosure may be computer implemented. Accordingly, some embodiments of the present disclosure may take the form of an entirely hardware embodiment, an entirely software embodiment (including firmware, resident software, micro-code, etc.) or an embodiment combining software and hardware aspects that may all generally be referred to herein as a "circuit", a "module", or a "system". Furthermore, some embodiments of the present disclosure may take the form of a computer program product embodied in any tangible medium of expression having computer usable program code embodied in the medium.

Since some embodiments of the present disclosure can be implemented in software, some embodiments of the present disclosure can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device, and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the disclosure will now be described, by way of example only, and with reference to the following drawings in which:

FIG. 3*a* illustrates an example of an initialization segment of data encapsulated in a media file, as defined by ISO/IEC 14496-12;

FIG. 3*b* illustrates an example of one or more media segments of data encapsulated in a media file, as defined by ISO/IEC 14496-12;

FIG. 4*a* illustrates an example of description of sample dependencies using a sample group;

DETAILED DESCRIPTION OF THE DISCLOSURE

According to some embodiments, the disclosure makes it possible to improve the signaling of dependencies between samples of encapsulated media data. The disclosure also makes it possible to improve the selection of media data to be transmitted by a server and the indexing of portions and/or samples of encapsulated media data in order to enable a client, a reader, or a file parser to access, filter, or repair portions or samples of encapsulated media data and reconstruct a valid media file from portions or samples of encapsulated media data.

Figure 1:
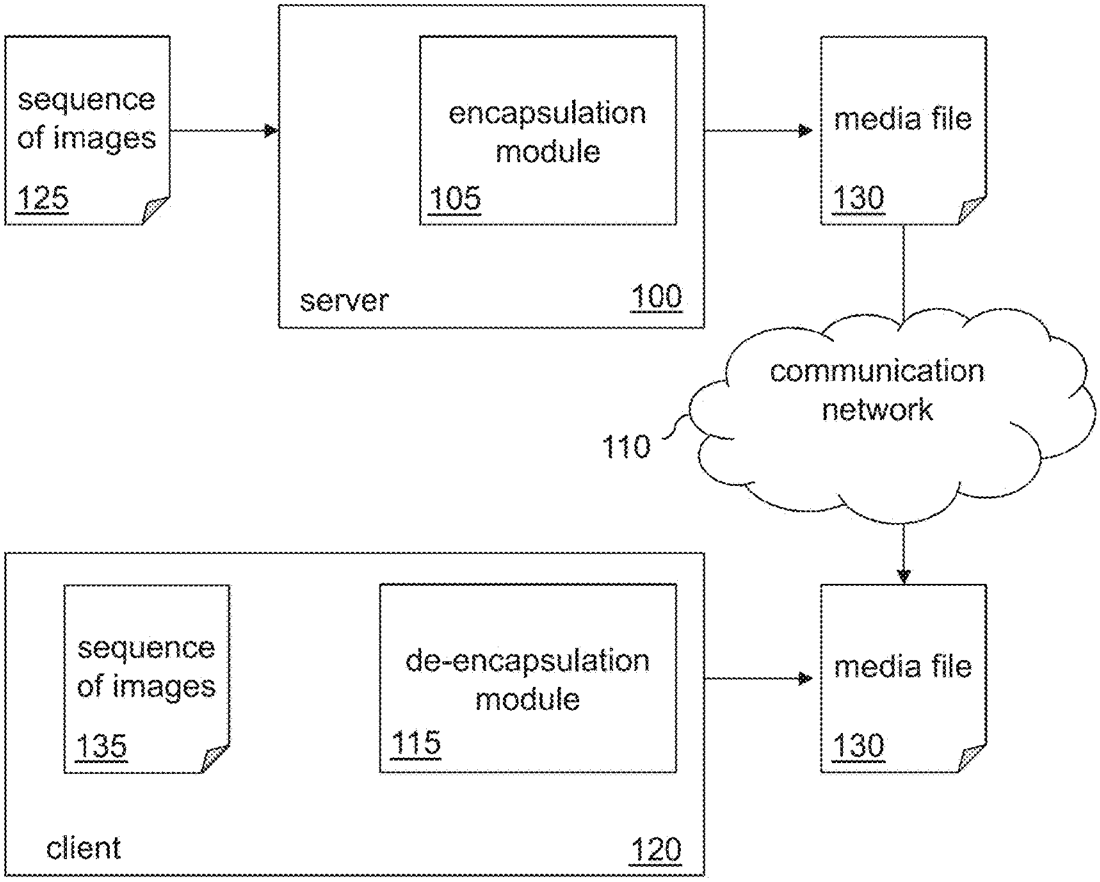
FIG. 1 illustrates an example of streaming media data from a server to a client.

FIG. 1 illustrates an example of streaming media data from a server to a client.

As illustrated, a server 100 comprises an encapsulation module 105 connected, via a network interface (not represented), to a communication network 110 to which is also connected, via a network interface (not represented), a de-encapsulation module 115 of a client 120.

Server 100 processes media data, e.g. video and/or audio data, for streaming or for storage. To that end, server 100 obtains or receives media data comprising, for example, an original sequence of images 125. Optionally, it can encode the sequence of images into encoded media data (or bit-streams) using a media encoder (e.g. a video encoder), not represented. It encapsulates the media data, possibly encoded, in one or more media files or media segments 130 using encapsulation module 105. The encapsulation process mainly consists in storing the media data in ISOBMFF boxes and generating and/or storing associated metadata in other ISOBMFF boxes describing the media data. Encapsulation module 105 comprises at least one of a writer or a packager to encapsulate the media data. The media encoder may be implemented within encapsulation module 105 to encode received media data or may be separate from encapsulation module 105. The server 100 may transmit the one or several media files or media segments 130, or portions thereof, to the client 120 via the communication network 110. A portion represents a byte-range of the media file and may comprise metadata only, metadata and one or several samples, or one or several samples. Possibly the last entity of a portion (e.g., the last sample or the last box in an ISOBMFF metadata) may be incomplete.

Client 120 is used for processing media file(s), or portions thereof, received from communication network 110, or read from a storage device, for example for processing media file 130. The one or several media files or media segments 130, or portions thereof, may be filtered or repaired by the server 100 before being transmitted or may be filtered or repaired by the client 120 after being received.

After the received media file has been de-encapsulated in de-encapsulation module 115 (also known as a parser), the de-encapsulated data (or parsed data), corresponding to media data or to a bit-stream, are optionally decoded, forming, for example, audio and/or video data that may be stored, rendered (e.g. play or display), or output. The media decoder may be implemented within de-encapsulation module 115 or it may be separate from de-encapsulation module 115. The media decoder may be configured to decode media data or one or more bit-streams in parallel.

It is noted that media file 130 may be communicated to de-encapsulation module 115 in different ways. In particular, encapsulation module 105 may generate media file 130 with a media description (e.g. DASH MPD or HTTP Live Streaming (HLS) manifest) and communicates (or streams) it directly to de-encapsulation module 115 upon receiving a request from client 120.

Figure 2:
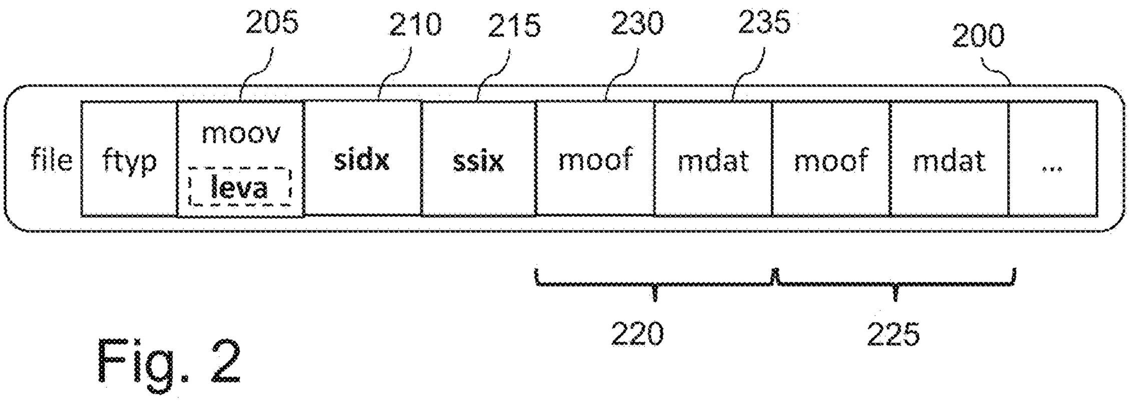
FIG. 2 illustrates an example of data encapsulated in a media file, as defined by ISO/IEC 14496-12.

For the sake of illustration, media file or media segment 130 may encapsulate media data (e.g. encoded audio or video) into boxes according to standards compliant with ISO Base Media File Format (ISOBMFF, ISO/IEC 14496-12 and ISO/IEC 14496-15 standards). In such a case, media file 130 may correspond to one or more media files (indicated by a FileTypeBox 'ftyp'), as illustrated in FIG. 2, or one or more segment files corresponding to one initialization segment (when indicated by a FileTypeBox 'ftyp') and/or one or more media segments (when indicated by a SegmentTypeBox 'styp'), as illustrated in FIGS. 3*a*, 3*b*, 4*b*, and 4*c*. Optionally, the segment files may also contain one or more Segment Index boxes 'sidx' and SubSegment Index boxes 'ssix' providing indexation information on media segments. According to ISOBMFF, media file 130 may include two kinds of boxes, "media data boxes" (e.g. 'mdat' or 'imda') containing the media data and "metadata boxes" (e.g.

'moov', 'moof', 'sidx', 'ssix') containing metadata defining placement and timing of the media data.

FIG. 2 illustrates an example of media data encapsulated in a media file, as defined by ISO/IEC 14496-12. As illustrated, media file 200 contains a 'moov' box 205 providing metadata to be used by a client during an initialization step. For the sake of illustration, the items of information contained in the 'moov' box may comprise the number of tracks present in the file as well as a description of the samples of each track contained in the file. According to the illustrated example, the media file further comprises an optional segment index box 'sidx' 210, an optional sub-segment index box 'ssix' 215 and several fragments such as fragments 220 and 225, each composed of a metadata part and a media data part. For example, fragment 220 comprises metadata represented by 'moof' box 230 and media data part represented by 'mdat' box 235. The 'moof' box 230 comprises metadata describing one or several tracks and corresponding one or several samples. The metadata in the 'moof' box 230 comprises the timing and location (or offsets) of the data of the one or several samples of the one or several tracks in the 'mda' box 235.

When present, the Segment index box 'sidx' 210 describes how the file is divided into one or several sub-segments (i.e. into one or several segment byte ranges), each sub-segment being composed of a complete set of fragments. It comprises an index making it possible to reach directly data associated with a particular sub-segment. It comprises, in particular, the duration and size of the sub-segment. When present, the Sub-segment index box 'ssix' 215 describes how a sub-segment is divided into one or several partial sub-segments (i.e. into one or several sub-segment byte ranges). It comprises an index making it possible to reach data of a sub-segment and a mapping of data byte ranges to level values. The meaning of level values can be either unspecified by ISOBMFF (i.e., the meaning of the level values may be defined by specific proprietary applications) or can be determined by the items of information described within an optional Level Assignment Box 'leva' located within the Movie box 'moov' 205. It provides the mechanism used to specify the assignment to a level, i.e., how to determine the meaning associated with each level value. In ISOBMFF specification, an attribute assignment_type in the Level Assignment Box 'leva' indicates the mechanism actually used to specify the meaning of the value assigned to a level. The following assignment_types are defined:

- 0 or 1: sample groups are used to specify level values, i.e., samples mapped to different sample group description indexes of a particular sample grouping lie in different levels (i.e., have different level values) within the identified track. In other words, for a level value that is equal to the index of a sample group description entry in the SampleGroupDescriptionBox 'sgpd' with grouping type equal to the grouping type specified in the Level Assignment Box 'leva', the meaning of this level value is given by this sample group description entry. In addition, only samples mapped into this sample group description entry belong to the level having this level value. (for value 1: assignment is carried out using a parameterized sample group (i.e., sample group including a grouping type parameter)),
- 2 or 3: the level assignment is done by track, and
- 4: the respective level contains the samples for a sub-track.

The media file 200 may include a chain of multiple segment index boxes 'sidx' and sub-segment index boxes 'ssix'.

FIG. 3*a* and FIG. 3*b* illustrate an example of data encapsulated in one or more media segments, being observed that media segments are suitable for live streaming.

FIG. 3*a* illustrates the first segment of encapsulated media data, as defined by ISO/IEC 14496-12. It is an initialization segment 300 that begins with the 'ftyp' box and with a 'moov' box 305 indicating the presence of movie fragments (e.g., with a box 'mvex', not represented). In addition, the initialization segment may comprise index information ('sidx' and 'ssix' boxes) and/or movie fragments. As described with reference to FIG. 2, when a Sub-segment index box 'ssix' is defined in one of several segments, an optional Level Assignment Box 'leva' may be declared within the Movie box 'moov' to describe the meaning of level values.

FIG. 3*b* illustrates an example of one or more media segments of data encapsulated in a media file, as defined by ISO/IEC 14496-12. As illustrated, media segment 350 begins with a 'styp' box. It is noted that for using segments like segment 350, an initialization segment 300 must be available. According to the example illustrated in FIG. 3*b*, media segment 350 may contain one segment index box 'sidx' 355, one sub-segment index box 'ssix' 360 and several fragments such as fragments 365 and 370. Segment index box 'sidx' 355 documents how the segment is divided into one or more sub-segments, each sub-segment being composed of a complete set of fragments. For example, each of the fragments 365 and 370 may represent a sub-segment or the combination of fragments 365 and 370 may represent one single sub-segment.

When present, the segment index box 'sidx' 355 comprises an index making it possible to reach directly all of the data associated with a particular sub-segment (typically a self-contained set of one or several consecutive movie fragments where a self-contained set contains one or several 'moof' boxes with the corresponding 'mdat' or 'imda' boxes). It comprises, in particular, the duration and size of the sub-segment. When present, the sub-segment index box 'ssix' 360 describes how a sub-segment is divided into one or several partial sub-segments. It comprises an index making it possible to reach all the data of a partial sub-segment and a mapping of data byte ranges to level values. Level values can be either unspecified by ISOBMFF (i.e., the meaning of the level values may be defined by specific proprietary applications) or can be documented by a Level Assignment Box 'leva' located within the Movie box 'moov' 305 and providing the meaning associated with each level values as described with reference to FIG. 2. Multiple segment index boxes 'sidx' and sub-segment index boxes 'ssix' can be defined and organized as a daisy-chain of boxes. When a segment beginning with a 'styp' box only contains index boxes (e.g. 'sidx', 'ssix'), it is called an index segment. Again, each fragment is composed of a metadata part and a media data part. For example, fragment 365 comprises metadata represented by 'moof' box 375 and media data part represented by 'mdat' box 380. Sub-segments and partial sub-segments are portions of the media file.

According to some embodiments of the disclosure, sample dependencies are described using the optional 'sidx' and 'ssix' boxes, that allow assigning level values to byte-ranges (also denoted portions, or partial sub-segments) of a media file, and using 'moof' boxes to retrieve information (e.g., size and offsets) about the samples comprised in the desired byte ranges and to retrieve the meaning of the level values associated with these desired byte ranges usually described by the mapping of samples with sample groups (as described by a 'leva' box with assignment type equal to 0 or 1). More precisely, when a byte-range or portion comprises multiple samples, a client or parser may determine from the SegmentIndexBox 'sidx' and the SubsegmentIndexBox 'ssix' the exact dependencies between the samples inside a byte-range or portion by creating and describing a hierarchy of samples.

In such embodiments, in order to interpret the signification of levels when sample groups are used to specify levels, a reader will have to process the MovieFragmentBox 'moof' to know whether sample group descriptions are added or modified in the fragment, and to know which samples are associated with which sample group description entry.

According to other embodiments of the disclosure, for example to avoid describing complex hierarchy of samples and/or to cope with low-latency streaming, an explicit list of dependencies of samples is provided. As described hereafter, these embodiments may be combined.

It is noted here that when doing low-latency streaming, transmitting or pushing data to a client should be done as fast as possible without having to wait for the complete segment to be generated. However, using a SubsegmentIndexBox 'ssix' mandates the use of a SegmentIndexBox 'sidx' (to get the number of entries in the SubsegmentIndexBox 'ssix' that is equal to the number of entries in the SegmentIndexBox 'sidx', and the SegmentIndexBox 'sidx' mandates a size and a duration per entry, which are not known until the end of the generation of the segment. In other words, SegmentIndexBox 'sidx' and SubsegmentIndexBox 'ssix' are not adapted for low-latency DASH/HLS.

It is also observed that when a server and a client are doing broadcast or multicast adaptive bit rate (ABR), some of the transmitted data may be lost or corrupted during the transmission. Therefore, the client or parser must decide whether the received data requires to be repaired or not. This may be based on sample dependencies. In particular, when a byte-range or portion of the media file assigned to one level value comprises multiple samples, if this portion is incomplete or corrupted, the client or parser needs to understand the samples impacted by the losses to take a decision (either to repair the losses or to drop the sample(s)), it being noted that some bytes missing or corrupted in a byte-range or portion assigned to one level can invalidate one of the following:

- the entire byte range(s) for that level,
- a subset of the samples in that level, or
- only the last (in decoding order) sample in that level.

Therefore, providing an explicit list of dependencies for each sample of a set of samples allows a client, file reader, or parser to know exactly which samples are impacted when one sample cannot be decoded by choice or due to losses or corruption in the transmission.

FIG. 4*a* illustrates an example of description of sample dependencies using a sample group.

According to this particular embodiment, sample dependencies are declared in a sample group description entry 400 defined in a SampleGroupDescriptionBox with grouping_type equal to 'sdep' (or any other equivalent Four character code (4CC) not already used in ISOBMFF). The sample dependencies may represent any type of dependencies that indicates that a sample is required for decoding or rendering another sample.

The sample group description entry 400 allows describing the dependencies of a sample to one or several other samples in the same track (intra-track dependencies) and dependencies of the sample to one or several other samples in another track (inter-track dependencies). Thus, the sample group description entry 400 allows describing, e.g., single track dependencies. The sample group description entry 400 may also describe dependencies for coded streams encapsulated as multiple tracks. For example for layered coded bitstreams, each track may carry one or more layers and there may be dependencies between the layers and thus from one track to another. It may comprise the following attributes:

- num_dependencies that indicates the number of samples that the described sample depends on in the same track. Value 0 means that the sample does not depend on any other sample in the same track;
- num_inter_dependencies indicates the number of samples that the described sample depends on in other tracks. Value 0 means that the sample does not depend on any other sample in any other track;
- depended_sample_num_diff (also denoted 'dsd' in FIGS. 4*a*, 4*b* and 4*c*) indicates the difference between the sample number (i.e., sample ordering number in the track) of the sample being described and of the sample it depends on. This value is equal to or greater than 1 and it is strictly less than the sample number (i.e., sample ordering number) of the sample being described. For example, the value 2 indicates that the sample having the sample number (i.e. sample ordering number) equal to N depends on the sample having the sample number (i.e. sample ordering number) equal to N−2. depended_sample_num_diff[i] corresponds to the $i^{th}$ intra-track dependency of the sample being described for i between 0 and num_dependencies minus 1;
- ref_track_index indicates the index of the reference on the track comprising the sample that the described sample depends on, as indicated in the track reference of type 'tdep' (i.e., the index of the track identifier in the TrackReferenceTypeBox with reference_type equal to 'tdep' in the TrackReferenceBox 'tref'). Value 1 indicates the first entry and value 0 is reserved;
- depended_inter_sample_num_diff (also denoted 'disd' in FIGS. 4*a*, 4*b* and 4*c*) indicates an inter-track dependency, i.e., indicates the difference between the sample, in the ref_track_index track, temporally corresponding to the sample being described (i.e., the translated sample number of the sample being described) and the sample that the sample being described depends on. Value should not be equal to 0 and should be strictly less than the translated sample number of the sample being described. The translated sample number is the sample number of the sample with the same decoding time (of the sample being described), in the referenced track, if present, or one plus the sample number of the sample immediately preceding the decoding time.

To avoid listing several times known dependencies (inter or intra), the sample dependencies or references described by the sample group description entry 400 may be restricted to direct sample dependencies (or references). It is restricted by definition, i.e. it should only comprise direct sample dependencies. E.g., when a first sample directly depends on a second sample in a track, and a third sample directly depends on the first sample in the track, but the third sample does not (directly) depend on the second sample in the track, the second sample is not counted in the value of num_dependencies in the sample group description entry 400 the third sample is mapped to and there is no sample offset to this second sample.

Similar reasoning applies for num_inter_dependencies.

In a variant, a sample group description entry indicating sample dependencies may comprise a flag indicating whether only direct sample dependencies are listed or direct and indirect dependencies are listed.

A sample group description entry 400 is associated with a given sample either using the default sample grouping or by assigning the sample group description entry 400 to the sample it describes using a SampleToGroupBox 'sbgp'.

Using the default sample grouping means using a SampleGroupDescriptionBox 'sgpd' with version>=2 and grouping type equal to 'sdep' (or equivalent 4CC value) and setting its default_group_description_index with the index on the sample group description entry 400 within the SampleGroupDescriptionBox 'sgpd'.

In a variant, the sample group description entry 400 may only describe intra-track dependencies (with attributes num_dependencies and depended_sample_num_diff, or only inter-track dependencies with attributes num_inter_dependencies, ref_track_index and depended_inter_sample_num_diff).

Samples that are not mapped into this sample group are considered with no dependencies.

An advantage of defining the sample dependencies using a sample group is that this feature may benefit from all the features offered by a sample group.

As described above, the sample dependencies signaling may benefit from the default sample grouping mechanism where samples can be mapped per default to a sample group description entry without defining a corresponding SampleToGroupBox using the field default_group_description_index. This field specifies the index of the sample group description entry which applies to all samples in the track for which no sample to group mapping is provided through a Sample ToGroupBox. For version strictly less than 2, this field is not coded and has the value zero. A value of zero indicates that no default mapping for samples to a group description entry for this grouping_type is provided, meaning that samples that are not explicitly mapped by a Sample ToGroupBox are not mapped into any of the group description entries of this grouping_type.

When a movie is fragmented, the index (either default_group_description_index in SampleGroupDescriptionBox or group_description_index in SampleToGroupBox) may refer to a sample group description entry of the SampleGroupDescriptionBox with same grouping_type either in the MovieBox or in the TrackFragmentBox.

The sample dependencies signaling using a sample group may also be combined with the flags values that may be defined in the SampleGroupDescriptionBox: static_group_description and/or static_mapping.

static_group_description: Flag mask is 0x000001. The value 1 indicates that there are no SampleGroupDescriptionBoxes of this grouping_type in any TrackFragmentBox of this track.

static_mapping: Flag mask is 0x000002. The value 1 indicates that there are no SampleToGroupBoxes of this grouping_type in this track (in neither the SampleTableBox or any TrackFragmentBox of this track); all samples therefore map to the default.

It can be noted that when the static_mapping flag is set and default_group_description_index is equal to zero or is unspecified, this means that none of the entries of the SampleGroupDescriptionBox actually map to samples per default, but this default can be changed for a fragment by defining in the fragment a SampleGroupDescriptionBox with version>=2, with same grouping_type and default_group_description_index>0.

These flags static_group_description and static_mapping allows signaling various possibilities:

static_group_description without static_mapping: the SampleGroupDescriptionBox is only in the MovieBox for the given grouping_type, but samples of the track may map to any entry in this SampleGroupDescriptionBox. This means, when combined with a grouping type 'sdep', that all the SampleDependencyGroupEntry 400 for a given track are defined within the MovieBox of the media presentation, static_mapping without static_group_description: everything in a fragment maps to at most one group; there may be new SampleGroupDescriptionBoxes of this type in fragments; depending on their version, the SampleGroupDescriptionBoxes can identify a default sample group, or that samples are unmapped. This means, when combined with a grouping type 'sdep', that all the samples of a given fragment are mapped into the same SampleDependencyGroupEntry (defined either in the MovieBox or the fragment itself) or unmapped, and both static_group_description and static_mapping: every sample maps to the default indicated in the SampleGroupDescriptionBox in the MovieBox; that SampleGroupDescriptionBox can indicate a default sample group or indicate that all samples are unmapped, depending on its version. This means, when combined with a grouping type 'sdep', that all the samples of a given track are mapped to a same SampleDependencyGroupEntry.

Figure 4B:
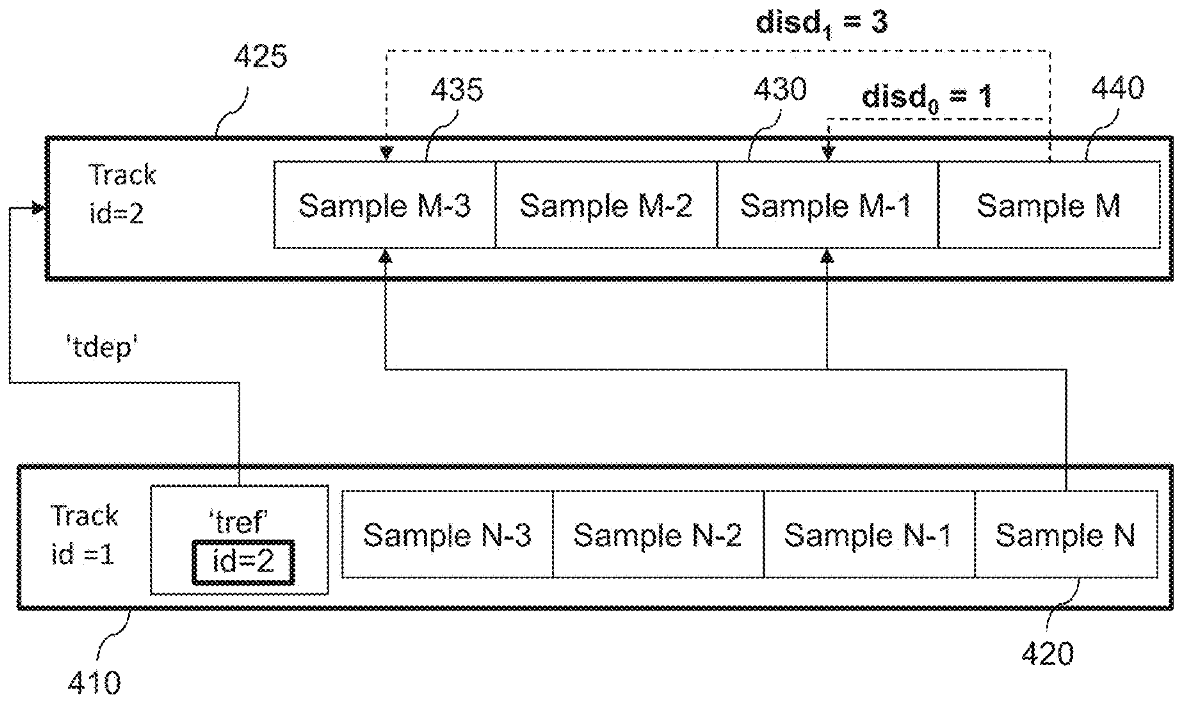
FIG. 4*b* illustrates an example of inter-track dependencies between samples, from one track to another track.

FIG. 4*b* illustrates an example of inter-track dependencies between samples, from one track to another track.

According to this example, track 410 (with track id=1) comprises a plurality of samples among which sample N, referenced 420, that depends on both sample M−1, referenced 430, and sample M-1, referenced 435, from track 425 (with track_id=2). The track 410 comprises a TrackReferenceBox 'tref' containing a TrackReferenceTypeBox with reference-type equal to 'tdep' (or any other equivalent 4CC not already used in ISOBMFF) and containing a single entry (with index 1) comprising the track id of the track 425 (i.e., track id=2).

To describe the sample dependencies, sample N (420) is associated with a sample group description entry such as sample group description entry 400 in FIG. 4*a*, wherein only num_inter_dependencies, ref_track_index and depended_inter_sample_num_diff attributes are present (i.e., num_dependencies and depended_sample_num_diff [num_dependencies] are optional and not defined, i.e. (i.e., they are not coded). In a variant, num_dependencies is present and equal to 0 and depended_sample_num_diff[ ] is not defined since num_dependencies is equal to 0.

According to this example, the sample group description entry associated with the sample N (420) comprises a num_inter_dependencies equal to 2 to indicate two dependencies and two pairs of values (ref_track_index, depended_inter_sample_num_diff) comprising the two pairs of values (1, 1) and (1, 3) corresponding respectively to sample M-1 (430) and sample M-3 (435) in the track (425) identified with the ref_track_index. The offsets given by depended_inter_sample_num_diff[0] and depended_inter_sample_num_diff[1] (also denoted $disd_0$ and $disd_1$ in the FIG. 4*b*) to the samples M-1 and M-3 respectively are relative to sample M (440), the sample M being determined as described in the semantics of depended_inter_sample_num_diff described in reference to FIG. 4*a*.

In a variant, the sample group description entry 400 may comprise a number of dependencies per ref_track_index and a loop for each ref_track_index listing all the depended_inter_sample_num_diff for a given ref_track_index to avoid repeating it for each inter-track dependency.

Figure 4C:
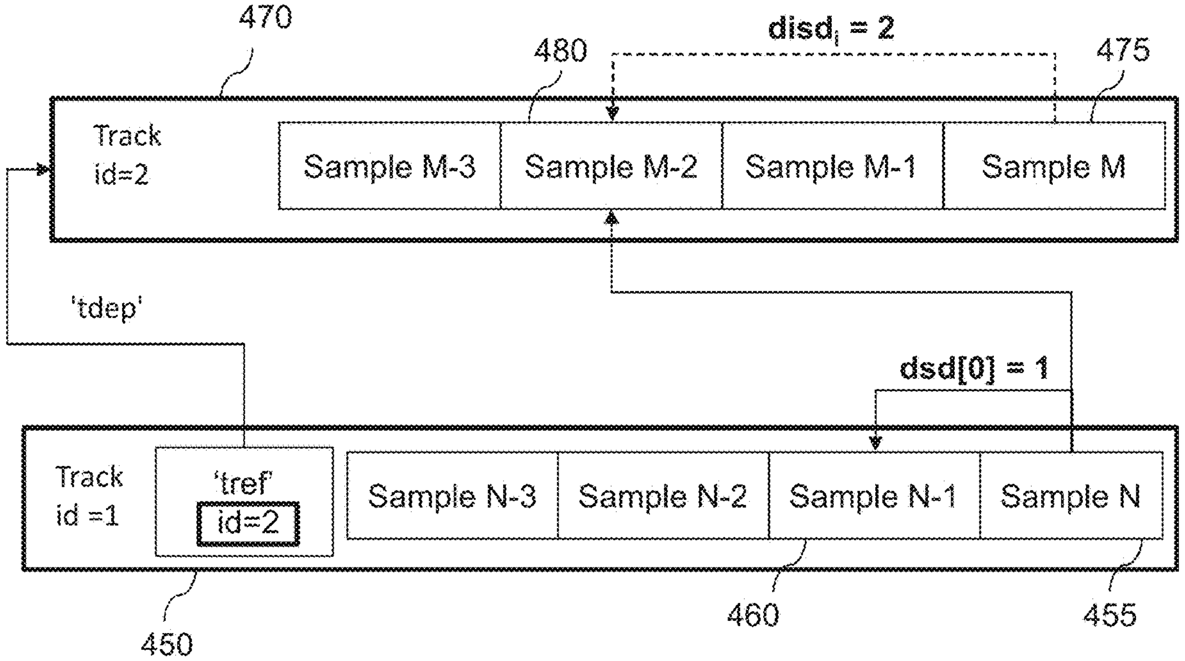
FIG. 4*c* illustrates an example of inter-track and intra-track dependencies between samples.

FIG. 4*c* illustrates an example of inter-track and intra-track dependencies between samples, i.e., one or several samples depend on one or several samples belonging to the same track and one or several samples depend on one or several samples belonging to one or several other tracks.

The track 450 (with track id=1) comprises a plurality of samples among which sample N, referenced 455, that depends on sample N-1, referenced 460, belonging to the same track 450, and depends on sample M-2, referenced 480, belonging to another track (track 470 with track id=2). The track 450 comprises a TrackReferenceBox 'tref' containing a TrackReferenceTypeBox with reference-type equal to 'tdep' (or any other equivalent 4CC not already used in ISOBMFF) and containing a single entry (with index 1) comprising the track id of the track 470 (i.e., track id=2).

To describe its dependencies sample N (455) is associated with a sample group description entry such as sample group description entry 400 in FIG. 4*a* wherein num_dependencies is equal to 1 and num_inter_dependencies equal to 1 for indicating one intra-track dependency one and inter-track dependency. depended_sample_num_diff contains one entry which value is equal to 1 to designate the sample N-1 (460). ref_track_index is set to 1 to indicate the first entry in the TrackReference TypeBox with reference-type equal to 'tdep' identifying the track 470 with track id equal to 2. depended_inter_sample_num_diff comprises a single value which is equal to 2 to designate the sample M-2 (480), relative to the sample M, referenced 475, in the track 470 that corresponds to sample N (455) in the track 450.

Figure 5A:
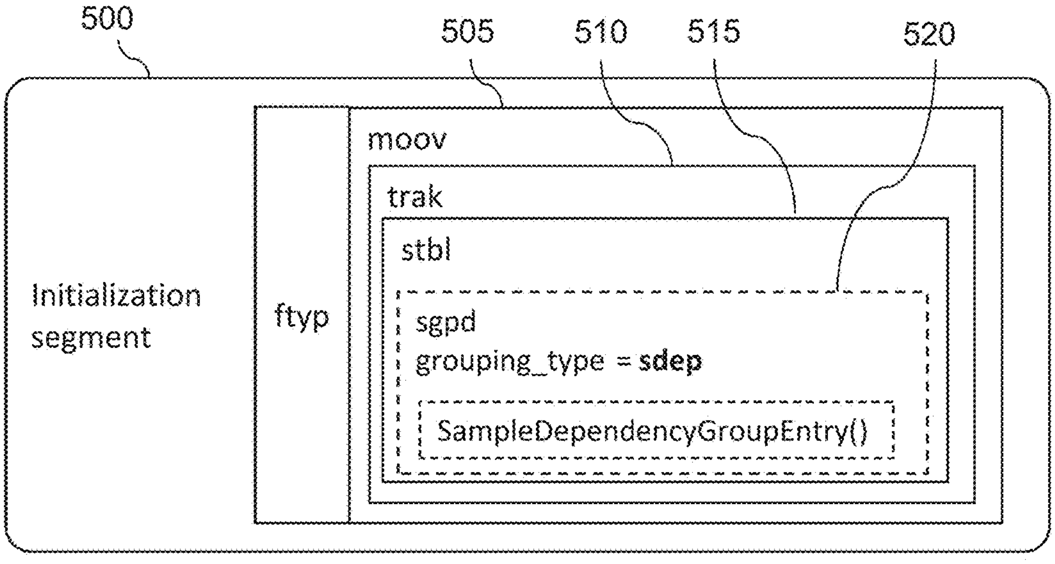
FIG. 5*a* illustrates the first segment of encapsulated media data.

FIG. 5*a* illustrates the first segment of encapsulated media data. It is an initialization segment 500 that begins with the 'ftyp' box and with a 'moov' box 505 indicating the presence of movie fragments (e.g., with a box 'mvex', not represented). In addition, the initialization segment may comprise index information ('sidx' and 'ssix' boxes) describing portions of the encapsulated media data and/or movie fragments, not represented, as described with reference to FIGS. 2 and 3*a*. The 'moov' box may describe one or more tracks 'trak' 510. A track may comprise a SampleGroupDescriptionBox with grouping type 'sdep' providing the sample dependencies group entries that may be associated with any sample of the track either by default sample grouping or by a SampleToGroupBox 'sbgp' with grouping type 'sdep' defined at fragment level (i.e., in 'traf' boxes).

Figure 5B:
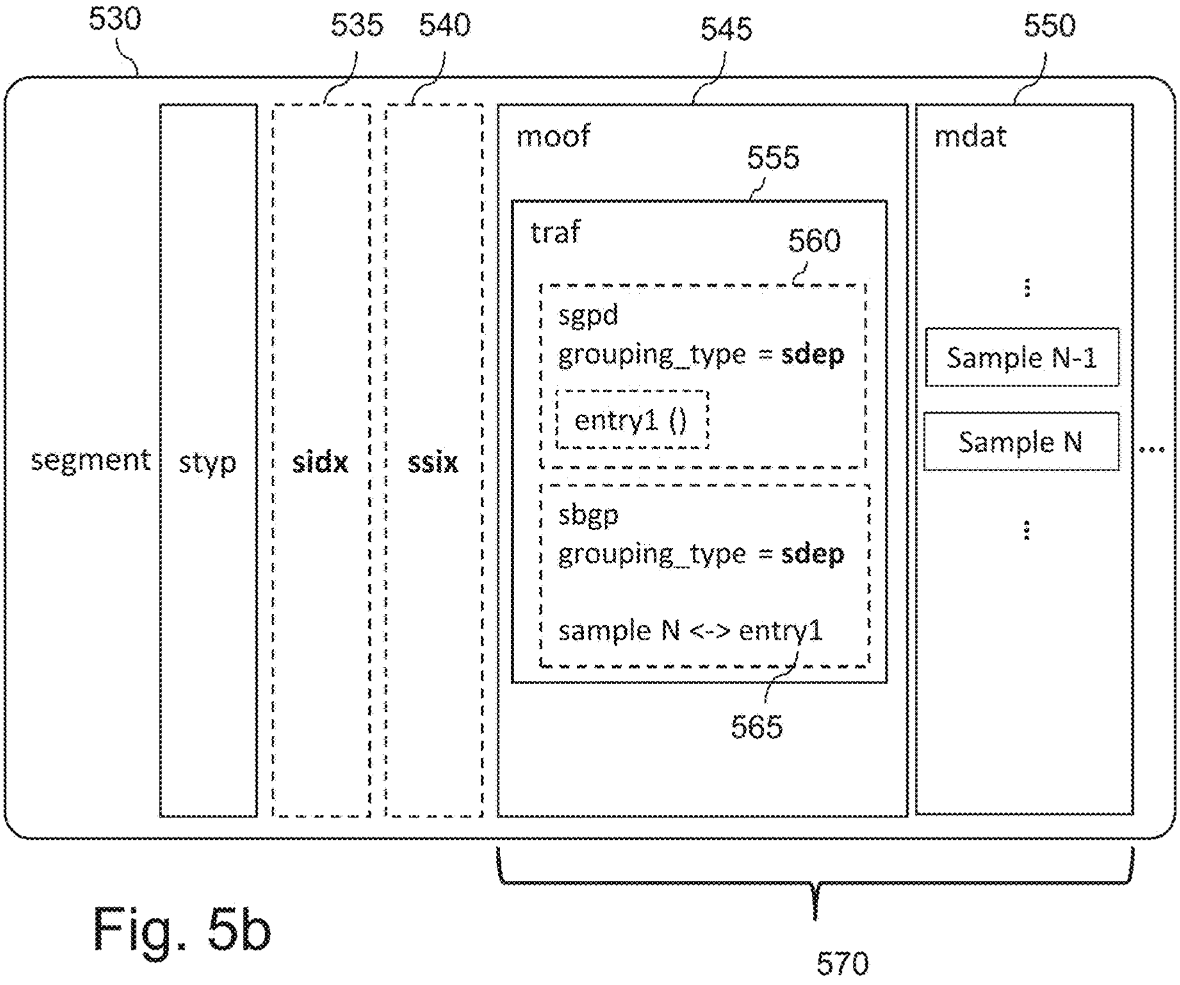
FIG. 5*b* illustrates an example of one or several media segments of data encapsulated in a media file.

FIG. 5*b* illustrates an example of one or several media segments of data encapsulated in a media file.

As illustrated, media segment 530 begins with a 'styp' box and may comprise one optional segment index box 'sidx' 535, one optional sub-segment index box 'ssix' 540, and several fragments such as fragments 570.

The metadata, describing the samples from the 'mdat' box 550 of the fragment 570 in segment 530, are located in the corresponding 'moof' box 545. The 'moof' box may comprise one or more track fragment boxes 'traf' 555. Multiple track fragment boxes are present when the samples of multiple tracks are multiplexed or stored in the same 'mdat' box. In turn, track fragment box 'traf' 555 may comprise a SampleGroupDescriptionBox 'sgpd' with grouping type 'sdep' describing the sample dependencies group entries that may apply to one or several samples of the track fragment. A Sample dependencies group entry may be actually associated with a sample of the track fragment with a SampleToGroupBox 'sbgp' 565 with grouping type 'sdep'. It can associate a sample either with an entry of the SampleGroupDescriptionBox 'sgpd' with grouping type 'sdep' from the 'moov' box, if present, or with an entry of the SampleGroupDescriptionBox 'sgpd' with grouping type 'sdep' defined in the same containing track fragment box 'traf'.

In an alternative embodiment, rather than declaring the sample dependencies as a sample group, the sample dependencies are declared in a full box, e.g., SampleDependencyGroupBox, in the SampleTableBox 'stbl' of the 'moov' box or the TrackFragmentBox 'traf' in the 'moof' box of a media fragment.

In such a case, the box may be defined as follows:

```
Box Type: 'sdep'
Container: SampleTableBox or TrackFragmentBox
Mandatory: No
Quantity: Zero or one
aligned(8) class SampleDependencyGroupBox extends FullBox ('sdep', version, flags)
{
  [
    int bpd = (flags&1) ? 16 : 8;
    unsigned int(bpd) num_dependencies;
    unsigned int(bpd)depended_sample_num_diff[num_dependencies];
    if (version==1) {
      unsigned int(bpd) num_inter_dependencies;
      for (i=0; i<num_inter_dependencies; i++) {
        unsigned int(32) ref_track_index;
        unsigned int(bpd) depended_inter_sample_num_diff;
```

-continued

```
        }
      }
    ](nb_samples)
}
```

wherein num_dependencies, depended_sample_num_diff, num_inter_dependencies, ref_track_index, depended_inter_sample_num_diff are defined as in the previous embodiment described by reference to FIG. 4*a*.

The value of (flags&1) indicates whether the attributes of the full box are coded on 16 bits or 8 bits (variable bpd).

According to this embodiment, setting the version of the box to the value 0 indicates that only intra-track dependencies are present, while setting the version of the box to the value 1 indicates that both intra-track and inter-track dependencies are present.

In a variant the box may be defined as follows.

```
Box Type: 'sdep'
Container: SampleTableBox or TrackFragmentBox
Mandatory: No
Quantity: Zero or one
aligned(8) class SampleDependencyGroupBox extends FullBox ('sdep', version, flags)
{
    [
      int bpd = (flags&1) ? 16 : 8;
      unsigned int(bpd) num__inter__dependencies;
      for (i=0; i<num__inter__dependencies; i++) {
        unsigned int(32) ref__track__index;
        unsigned int(bpd) depended__inter__sample__num__diff;
      }
      if (version==1) {
        unsigned int(bpd) num__dependencies;
        unsigned int(bpd)depended__sample__num__diff[num__dependencies];
      }
    ](nb__samples)
}
```

wherein num_dependencies, depended_sample_num_diff, num_inter_dependencies, ref_track_index, depended_inter_sample_num_diff are defined as in the previous embodiment described by reference to FIG. 4*a*.

The value of (flags&1) indicates whether the attributes of the full box are coded on 16 bits or 8 bits (variable bpd).

According to this variant, setting the version of the box to the value 0 indicates that only inter-track dependencies are present, while setting the version of the box to the value 1 indicates that both intra-track and inter-track dependencies are present It can be noted that dependency patterns depend on the encoder decisions (e.g. GOP structure), and can vary from GOP to GOP or can be a fixed subset. Fixed subset of patterns advocates for usage of sample groups to describe the sample dependencies, when dynamic variations (sample per sample) would rather go for using a simple full box.

According to some variants of the above embodiments using either a sample group or a full box to describe the sample dependencies, the SampleDependencyGroupEntry( ) or full box with 4CC 'sdep' may further comprise and associate a nested "dependency layer" or "level" with a sample to indicate a priority order to determine whether it may be dropped or not (level by level, e.g., from the highest to the lowest or from the lowest to the highest). For example, when going from the highest to the lowest, once level N is dropped, level N−1 may be dropped, and so on. On the contrary, when going from the lowest to the highest, once level N is dropped, level N+1 may be dropped, and so on. For example, for a list of samples S1 to S9 and if the samples are associated with levels as follows:

S1: level 0

S2, S6: level 1

S3, S7: level 2

S4, S8: level 3

S5, S9: level 4 once samples S5 and S9 with level 4 are dropped, the device may decide to drop or skip the samples from lower level, i.e. sample S4 and S8 with level 3.

In a variant, this level information may be obtained from SubsegmentIndexBox 'ssix' indicating these levels (using a value level +2, to preserve 0 and 1 values already used for byte-ranges comprising metadata, e.g. a MovieFragmentBox 'moof').

Above embodiments, that use an offset (also denoted sample offset) relative to the mapped sample to designate the sample it depends on, have proven to be efficient, e.g., when consecutive frames have the same dependency pattern (e.g., depend on N−1 and N−2) or when multiple groups of pictures (GOPs) need to be described. They also provide a faster identification of the samples the mapped sample depends on because they do not require resolving an identifier of each depended on sample. However, the above embodiments may be further improved, e.g., when multiple samples depend on the same sample(s), i.e. when samples have the same dependencies as others.

According to some variants of the above embodiments, using either a sample group or a full box to describe the sample dependencies, the SampleDependencyGroupEntry( ) or full box with 4CC 'sdep' may further comprise a flag allowing to choose the base sample from which the sample offsets apply between:

- sample offsets relative to the mapped sample, or
- sample offsets relative to a previous sample used as a reference point (also denoted reference sample or previous reference sample) in a track.

In embodiments using a sample group to describe the sample dependencies, the sample offsets relative to a previous reference sample allows reusing a sample group description entry within a GOP or across GOPs. The offsets relative to a previous reference sample also allow reusing a sample group description entry for referencing samples with the same dependencies. The reference sample (also denoted previous reference sample) is the previous sample with no mapping to a sample group with grouping type 'sdep', e.g. the previous Instantaneous Decoder Refresh (IDR), Clean Random Access (CRA), or Broken Link Access (BLA) picture. The access to the previous reference sample is fast: it doesn't require to look for a sample identifier, e.g. by browsing the sample mapping (sample to group and sample group description browsing), the previous reference sample can be found by checking the sample to group box with grouping_type 'sdep' to retrieve the first sample, preceding the mapped sample, that is not mapped to the sample group 'sdep'.

In a variant, the sample group 'sdep' provides explicit coding dependencies of samples towards other samples in the same track or in referenced tracks.

Dependencies are either described by a relative distance from the mapped sample (offset_from_reference=0) or from the last previous sample not mapped to the SampleDependencyGroupEntry, in other words, from the previous reference sample (offset_from_reference=1).

In a particular embodiment, the listed dependencies only contain the direct dependencies, i.e. if sample A depends on sample B which in turn depends on sample C, only sample B is listed as a dependency to sample A. Sample B is not counted in the number of dependencies (indicated by num_dependencies field).

The version of the SampleGroupDescriptionBox for the 'sdep' sample group is greater than or equal to 1.

A sample group 'sdep' may or may not be defined as an essential sample group. When it is declared as an essential sample group, a parser should be able to interpret it to play the track containing this sample group. It may be set as essential for media application requiring adaptation of the transmission, for example selecting a subset of samples to transmit when network conditions are getting bad or for CPU load adaptation when a device cannot play at expected frame rate all the samples, some samples that other samples are not depending on may be skipped.

The SampleDependencyGroupEntry( ) may be defined as follows:

```
Group Types: 'sdep'
Container: Sample Group Description Box ('sgpd')
Mandatory: No
Quantity:   Zero or more
class SampleDependencyGroupEntry extends SampleGroupDescriptionEntry ('sdep')
{
  unsigned int(1) offset__from__reference;
  unsigned int(1) has__inter__deps;
  unsigned int(14) num__dependencies;   // intra-track
  if (has__inter__deps)
    unsigned int(16) num__inter__dependencies; // inter-track
  else
    num__inter__dependencies = 0;
  if (num__dependencies < 0x3FFF)
    signed int(16) depended__sample__num__diff[num__dependencies];
    for (i=0; i<num__inter__dependencies; i++){
    unsigned int(16)track__ref__index;
    signed int(16)depended__inter__sample__num__diff;
  }
}
```

wherein, being noted that in the following, a previous reference sample of track A refers to the previous sample in track A with no mapping to the SampleDependencyGroupEntry, meaning for example the previous IDR, BLA or CRA, and a translated sample number is the sample number of the sample with the same decoding time (as the sample being described) in the referenced track if present, or one plus the sample number of the sample immediately preceding the decoding time, offset_from_reference indicates the base sample (i.e. the sample used as origin or reference for the sample offsets) from which is computed the depended_sample_num_diff or depended_inter_sample_num_diff (when present) values. offset_from_reference=0 means values (for depended_sample_num_diff and depended_inter_sample_num_diff) are relative to the sample number of the sample being described for dependencies in the track (also denoted mapped sample) or to the translated sample number in the referenced track for inter-track dependencies. offset_from_reference=1 means values (for depended_sample_num_diff and depended_inter_sample_num_diff) are relative to the sample number of the previous reference sample in the track or relatively to the translated sample number in the referenced track for inter-tracks dependencies, has_inter_deps indicates whether the samples mapped to this entry depend from sample(s) of another track (or other tracks) or not. Value 0 means dependency only from sample(s) of the same track. When has_inter_deps=0, num_inter_dependencies is inferred to be equal to 0. Value 1 means that samples mapped to this entry sample depends of sample(s) from another track (or other tracks), num_dependencies indicates the number of samples that the described sample depends on. Value 0 means no dependency to any other sample in the track. Value 0x3FFF (i.e. all bits set to 1) means dependencies are unknown, in which case has_inter_deps should be 0. Samples that are not mapped to any sample group entry indicates that samples are considered with no dependencies, num_inter_dependencies indicates the number of samples that the samples mapped to this entry depend on in other tracks. Value 0 means no dependency to any other samples in other tracks, depended_sample_num_diff indicates the value used to locate a sample's reference in the same track. If offset_from_reference-0, the value indicates the difference between the sample number of the sample being described (also denoted mapped sample) and the sample number of the sample depended on, and the value is strictly positive (for example, a value of 2 indicates that sample with number N depends on sample with number N−2). In a variant, the value is strictly negative (for example, a value of −2 indicates that sample with number N depends on sample with number N−2). If offset_from_reference=1, the value is the difference between the sample number of the previous reference sample $P_{ref}$ in the track of the sample being described and the sample number of the sample depended on, a negative value indicating a sample before $P_{ref}$, a positive value indicating a sample after $P_{ref}$ and a value of 0 meaning $P_{ref}$.

track_ref_index is the index in the track reference of type 'tdep' providing the track_ID of the referenced track. Value 1 indicates the first entry. Value 0 is reserved, and on, a negative value indicating a sample before $P^{IT}_{ref}$, a positive value indicating a sample after $P^{IT}_{ref}$ and a value of 0 meaning $P^{IT}_{ref}$.

In a variant, for inter-track dependencies, if offset_from_reference=1, the previous reference sample is not considered in the referenced track. Instead, the previous reference sample is selected in the same track as the mapped sample, and the value of depended_inter_sample_num_diff is computed as the difference between the translated sample number in the referenced track of the previous reference sample in current track and the sample number of the sample depended on, in the referenced track.

In a variant, the SampleDependencyGroupEntry comprises data for indicating which variant of the two above variants is used to compute the depended_inter_sample_num_diff value.

In a variant, the offset_from_reference flag is set per sample-diff offset rather than globally at the sample group entry level. An example of syntax (for SampleDependencyGroupEntry) for expressing the list of dependencies for intra-track would be:

```
for (i=0; i < num_dependencies; i++) {
      unsigned int(1) offset_from_reference;
      signed int(15) depended_sample_num_diff;
}
```

Similar syntax may be defined for inter-dependencies.

In this variant, the SampleDependencyGroupEntry( ) may be defined as follows:

```
Group Types: 'sdep'
Container: Sample Group Description Box ('sgpd')
Mandatory: No
Quantity:   Zero or more
class SampleDependencyGroupEntry extends SampleGroupDescriptionEntry ('sdep')
{
  unsigned int(1) has_inter_deps;
  unsigned int(15) num_dependencies;   // intra-track
  if (has_inter_deps)
    unsigned int(16) num_inter_dependencies; // inter-track
  else
    num_inter_dependencies = 0;
  if (num_dependencies < 0x3FFF) {
    for (i=0; i < num_dependencies; i++) {
      unsigned int(1) offset_from_reference;
      signed int(15) depended_sample_num_diff;
    }
  }
  for (i=0; i<num_inter_dependencies; i++){
    unsigned int(16)track_ref_index;
    unsigned int(1) offset_from_reference;
    signed int(15)depended_inter_sample_num_diff;
  }
}
```

depended_inter_sample_num_diff indicates the value used to locate a sample's reference in the referenced track. If offset_from_reference=0, the value indicates the difference between the translated sample number of the sample being mapped to this entry and the sample number of the sample depended on, and the value is strictly positive (for example, a value of 2 indicates that sample with number N depends on sample with number N−2). In a variant, the value is strictly negative (for example, a value of −2 indicates that sample with number N in current track depends on sample N−2 in the track referenced by track_ref_index relatively to the translated sample N). If offset_from_reference=1, the value is the difference between the sample number of the previous reference sample $P^{IT}_{ref}$ in the referenced track and the sample number of the sample depended wherein has_inter_deps, num_dependencies, num_inter_dependencies, offset_from_reference, depended_sample_num_ diff, track_ref_index, and depended_inter_sample_num_diff are defined as in the previous variants.

In the above variants, the used of signed offset allows for documenting dependencies in open-GOP patterns, negative value possibly indicating frames or samples before the previous reference points. It can be noted that the result of determining the dependencies of a sample might be undefined when using fragmentation: although the sample group description may be complete for each movie fragment, the sample to group mapping is possibly no longer known at the start of each movie fragment. Hence, if a referenced sample cannot be resolved, dependencies for the (mapped) sample are unknown.

It is noted that when the movie fragment is a dependent movie fragment, i.e. the metadata describing the movie fragment depends on metadata describing a previous movie fragment, the sample group description may not be complete for the movie fragment. In such a case, it may be needed to combine sample group description in the dependent movie fragment with sample group description in the movie fragment it is depending on to obtain a complete sample group description.

Following examples illustrate the efficiency gain obtained with the embodiments using the offset_from_reference flag to indicate different base samples used as reference points compared to embodiments using only the mapped sample as a base sample to compute the offsets.

In the following, the letter I designates an Intra-Frame, the letter P designates a Predicted Frame, and the letter B designates a Bi-Directional Frame.

In a first example, a single track with a Group of Pictures (GOP) pattern in decoding order is considered, as follows:

IPBBPBBPBBPBBPBBPBBPBBPBB (one I+8 PBB pattern)

All P refer to I, B refers to previous P and I (there is no hierarchical B frame).

In embodiments without the offset_from_reference flag, the dependencies of samples may be described as follows:

- I(1): no dependency (deps) so no need to map to sample group entry
- P(2): dep_diff=[1]
- B(3): dep_diff=[1,2]
- B(4): dep_diff=[2,3]
- P(5): dep_diff=[4]
- B(6): dep_diff=[5,1]
- B(7): dep_diff=[6,2]
- // etc.

In this example, an entry is needed for each sample except the I frame, hence 24 entries are needed for describing the full GOP.

In embodiments using the offset_from_reference flag, the dependencies of samples may be described as follows:

- I(1): no deps so no need to map to sample group entry⇒reference point
- P(2): dep_diff=[0] // entry #1 with offset_from_reference=1
- B(3): dep_diff=[0,1] // entry #2 with offset_from_reference=1
- B(4): dep_diff=[0,1] // reuse entry #2
- P(5): dep_diff=[0] // reuse entry #1
- B(6): dep_diff=[0,4] // entry #3 with offset_from_reference=1
- B(7): dep_diff=[0,4] // reuse entry #3
- P(8): dep_diff=[0] // reuse entry #1
- B(9): dep_diff=[7,0] // entry #4 with offset_from_reference=1)
- B(10): dep_diff=[7,0] // reuse entry #4
- // etc.

Accordingly, only one entry for first P and one entry per first B are needed, hence 1+8=9 entries are needed for the full GOP, while the previous embodiment (without the offset_from_reference flag) needs 24 entries.

In a second example, a Group of Pictures (GOP) pattern of 25 frames in decoding order is considered, as follows:

I P $B^0B^1B^2B^3B^1B^2B^0B^1B_2B^0B^1B^2B^0B^1B^2B^0B^1B^2B^0B^1$ $B^2B^0B^1$

I is first in GOP, P is last in GOP (in presentation order), there are hierarchical B frames on 3 levels, $B^0$, $B^1$, and $B^2$.

In embodiments that do not use the offset_from_reference flag, the dependencies of samples may be described as follows:

- I(1): no deps so no need to map to sample group entry
- P(2): dep_diff=[1] // entry #1
- $B^0$(3): dep_diff=[2,1] // entry #2
- $B^1$(4): dep_diff=[2,1] // reuse entry #2
- $B^2$(5): dep_diff=[2,1] // reuse entry #2
- $B^0$(6): dep_diff=[4,5] // entry #3
- $B^1$(7): dep_diff=[5,1] // entry #4
- $B^2$(8): dep_diff=[2,1] // reuse entry #2
- $B^0$(9): dep_diff=[8,7] // entry #5
- $B^1$(10): dep_diff=[8,1] // entry #6
- $B^2$(11): dep_diff=[2,1] // reuse entry #2
- // etc.

In this case, a better compaction is possible due to the dependency pattern [2,1] being present multiple times, and the entry defines for $B^0$(3) usable for any $B^2$(x) samples. We need 1(P)+1 per $B^0$+1 per $B^1$ minus $B^1$(4), so in this example 1+8+(8−1)=16 entries.

In embodiments using the offset_from_reference flag, the dependencies of samples may be described as follows:

- I(1): no deps so no need to map to sample group entry⇒reference point
- P(2): dep_diff=[1] // entry #1 with offset_from_reference=0 (could use=1 with a diff of 0)
- $B^0$(3): dep_diff=[1,0] // entry #2 with offset_from_reference=1
- $B^1$(4): dep_diff=[2,1] // entry #3 with offset_from_reference=0
- $B^2$(5): dep_diff=[2,1] // reuse entry #3
- $B^0$(6): dep_diff=[1,0] // reuse entry #2
- $B^1$(7): dep_diff=[5,1] // entry #4 with offset_from_reference=0
- $B^2$(8): dep_diff=[2,1] // reuse entry #3
- $B^0$(9): dep_diff=[1,0] // reuse entry #2
- $B^1$(10): dep_diff=[8,1] // entry #5
- $B^2$(11): dep_diff=[2,1] // reuse entry #3
- // etc.

Here, only one entry is needed for P, one entry for the first $B^0$, one entry for each $B^1$, and each $B^2$ may use the first $B^1$. Hence, only 10 entries are needed(1(P)+1(B0)+8(B1)), while previous embodiment needs 16 entries.

In a third example, a Group of Pictures (GOP) pattern of 25 frames in decoding order is considered, as follows:

IP $B^0B^1B^1B^0B^1B^1B^0B^1B^1B^0B^1B^1B^1B^1B^1B^0B^1B^1B^0B^1B^1$ $B^0B^1$

In embodiments that do not used the offset_from_reference flag, the dependencies of samples may be described as follows:

- I(1): no deps so no need to map to sample group entry
- P(2): dep_diff=[1] // entry #1
- $B^0$(3): dep_diff=[2,1] // entry #2
- $B^1$(4): dep_diff=[2,1] // reuse entry #2
- $B^1$(5): dep_diff=[3,2] // entry #3
- $B^0$(6): dep_diff=[4,5] // entry #4
- $B^1$(7): dep_diff=[5,1] // entry #5
- $B^1$(8): dep_diff=[6,2] // entry #6
- $B^0$(9): dep_diff=[8,7] // entry #7
- $B^1$(10): dep_diff=[8,1] // entry #8
- $B^1$(11): dep_diff=[9,2] // entry #9
- //etc.

In this case, entry #2 is only reuse once for the first $B^1$(4), all other sample except I frames requires a description. A total of 23 entries is therefore required in the sample group description box.

In embodiments using the offset_from_reference flag, the dependencies of samples may be described as follows:

- I(1): no deps so no need to map to sample group entry⇒reference point

P(2): dep_diff=[1] // entry #1 with offset_from_reference=0

$B^0$(3): dep_diff=[0,1] // entry #2 with offset_from_reference=1

$B^1$(4): dep_diff=[1,2] // entry #3 with offset_from_reference=1

$B^1$(5): dep_diff=[1,2] // reuse entry #3

$B^0$(6): dep_diff=[0,1] // reuse entry #2

$B^1$(7): dep_diff=[5,1] // entry #4 with offset_from_reference=1

$B^1$(8): dep_diff=[5,1] // reuse entry #4

$B^0$(9): dep_diff=[0,1] // reuse entry #2

$B^1$(10): dep_diff=[8,1] // entry #5 with offset_from_reference=1

$B^1$(11): dep_diff=[8, 1] // reuse entry #5

Here, the P needs one entry, the first B0 needs one entry (other B0 can reuse it), and each first B1 needs its entry (second B1 reuses is). Hence, 10 entries are needed (1 (P)+1 (first B0)+8 (B1)), while the previous embodiment (without offset_from_reference flag) needs 23 entries.

As an alternative, to improve the above embodiments when multiple samples depend on a same sample, i.e. when samples have the same dependencies as others, another flag denoted same_dependency_flag may be defined in the sample group description entry indicating whether the mapped sample depends on the same samples as a previous sample in the track. When this flag is set, the entry gives the index, called sgpd_index, of the sample group description entry associated with the previous sample, and indicates that the mapped sample depends on the same samples as the previous sample mapped to the sample group description entry indicated by sgpd_index.

According to this variant, the SampleDependencyGroupEntry( ) may be defined as follows:

```
Group Types: 'sdep'
Container: Sample Group Description Box ('sgpd')
Mandatory: No
Quantity:   Zero or more
class SampleDependencyGroupEntry extends SampleGroupDescriptionEntry ('sdep')
{
   unsigned int(1) same_dependency_flag;
   if (same_dependency_flag) {
      unsigned int(1) in_traf_sgpd;
      unsigned int(14) sgpd_index;
   } else {
      unsigned int(1) has_inter_deps;
      unsigned int(14) num_dependencies;   // intra-track
      if (has_inter_deps)
         unsigned int(16) num_inter_dependencies; // inter-track
      else
         num_inter_dependencies = 0;
      unsigned int(16) depended_sample_num_diff[num_dependencies];
      for (i=0; i<num_inter_dependencies; i++){
         unsigned int(32) ref_track_index;
         unsigned int(16)depended_inter_sample_num_diff;
      }
}
```

wherein num_dependencies, num_inter_dependencies, depended_sample_num_diff, ref_track_index, and depended_inter_sample_num_diff are defined as in the different variants of the previous embodiment described by reference to FIG. 4*a*, and wherein same_dependency_flag indicates whether the mapped sample depends on the same samples as a previous sample or not. When same_dependency_flag is set to 1, the mapped sample depends on the same samples as the previous sample mapped to the sample group description entry of the sample group description box indicated by in_traf_sgpd and corresponding to the sample group description index indicated by sgpd_index. When same_dependency_flag is set to 0, the mapped sample depends on the samples indicated by the set of depended_sample_num_diff and depended_inter_sample_num_diff values in this entry, in_traf_sgpd indicates whether, when set to 1, sgpd_index is an index in the enclosing SampleGroupDescriptionBox, i.e. located in the current fragment. When set to 0, sgpd_index is an index in the SampleGroupDescriptionBox of the same grouping_type declared in the SampleTableBox of the track, sgpd_index designates the 0-based index of the sample group description entry in the SampleGroupDescriptionBox indicated by in_traf_sgpd that describes the sample dependencies of the mapped sample. In a variant the index may be 1-based and the value 0 is reserved, and has_inter_deps indicates whether the sample mapped to this entry depends from sample(s) of another track (or other tracks) or not. Value 0 means dependency only from sample(s) of the same track. When has_inter_deps=0, num_inter_dependencies is inferred to be equal to 0. Value 1 means that sample mapped to this entry depends of sample(s) from another track (or other tracks).

It is to be noted that when the sample dependencies sample group is used with dependent movie fragments, the scope of the sgpd_index may correspond to the sgpd in the movie fragment the dependent movie fragment depends on.

In another alternative, the SampleDependencyGroupEntry( ) may use both the same_dependency_flag and offset_from_reference flags, and may be defined as follow:

```
class SampleDependencyGroupEntry extends SampleGroupDescriptionEntry ('sdep')
{
  unsigned int(1) same_dependency_flag;
  if (same_dependency_flag) {
    unsigned int(1) in_traf_sgpd;
    unsigned int(14) sgpd_index;
  } else {
    unsigned int(1) offset_from_reference;
    unsigned int(1) has_inter_deps;
    unsigned int(13) num_dependencies;   // intra-track
    if (has_inter_deps)
      unsigned int(16) num_inter_dependencies; // inter-track
    else
      num_inter_dependencies = 0;
    if (num_dependencies < 0x1FFF)
      signed int(16) depended_sample_num_diff[num_dependencies];
    for (i=0; i<num_inter_dependencies; i++){
      unsigned int(32) ref_track_index;
      signed int(16)depended_inter_sample_num_diff;
    }
  }
```

wherein offset_from_reference, num_dependencies, num_inter_dependencies, depended_sample_num_diff, ref_track_index, and depended_inter_sample_num_diff are defined as in the different variants of the previous embodiment described by reference to FIG. 4*a*, and wherein same_dependency_flag, in_traf_sgpd, sgpd_index, and has_inter_deps are defined as for the previous variant.

Therefore, according to a particular aspect of the disclosure, there is provided a method of encapsulating media data in a media file, in a processing device, the media data comprising a plurality of samples, the method comprising: generating a first track comprising a media data part storing a first sequence of samples of the plurality of samples, the first track further comprising a metadata part describing the first sequence of samples, generating descriptive metadata describing a dependency between a given sample of the first track and another sample, the generated descriptive metadata being stored in the metadata part of the first track, and encapsulating the first track in the media file, wherein the generated descriptive metadata comprise an indicator indicating that the given sample depends on a same sample a previous sample depends on.

According to some embodiments, the generated descriptive metadata further comprise an index to indicate the same sample.

Still according to some embodiments, the method further comprises generating a second track comprising a media data part storing a second sequence of samples of the plurality of samples, the generated descriptive metadata describing a dependency between a given sample of the first track and a sample of the second track.

Still according to some embodiments, the generated descriptive metadata comprise a reference to the second track and an offset to the sample of the second track relative to a sample of the second track temporally corresponding to the given sample.

Still according to some embodiments, the generated descriptive metadata describes a group of samples, a sample of the first track that depends on another sample being associated with the described group of samples.

Still according to some embodiments, the generated descriptive metadata further comprises a number of samples, per track, on which a given sample of the first track depends.

Still according to some embodiments, the generated descriptive metadata further described a byte-range comprising the first sequence of samples.

Still according to some embodiments, the media file is an ISOBMFF media file.

Still according to a particular aspect of the disclosure, there is provided a method for processing a media file encapsulating media data, in a processing device, the media data comprising a plurality of samples, the method comprising:

obtaining descriptive metadata of a meta data part of a first track encapsulated in the media file, the first track further comprising a media data part storing a first sequence of samples of the plurality of samples, the obtained descriptive metadata describing a dependency between a given sample of the first track and another sample encapsulated in the media file, processing the given sample as a function of the described dependency, wherein the descriptive metadata comprise a flag indicating that the given sample depends on a same sample a previous sample depends on.

According to some embodiments, the descriptive metadata further comprise an index to indicate the same sample, the method further comprising obtaining the same sample.

Still according to some embodiments, the dependency is a dependency between the given sample of the first track and a sample of a second track encapsulated in the media file, the second track comprising a media data part storing a second sequence of samples of the plurality of samples.

Still according to some embodiments, the obtained descriptive metadata comprise a reference to the second track and an offset to the sample of the second track relative to a sample of the second track temporally corresponding to the given sample.

Still according to some embodiments, the obtained descriptive metadata describes a group of samples, a sample of the first track that depends on another sample being associated with the described group of samples.

Still according to some embodiments, the obtained descriptive metadata further described a byte-range comprising the first sequence of samples.

Still according to some embodiments, processing a given sample depending on another sample comprises filtering samples.

Still according to some embodiments, processing a given sample depending on another sample comprises repairing a damage or partially lost byte range of the media file.

Still according to some embodiments, the media file is an ISOBMFF media file.

Figure 6:
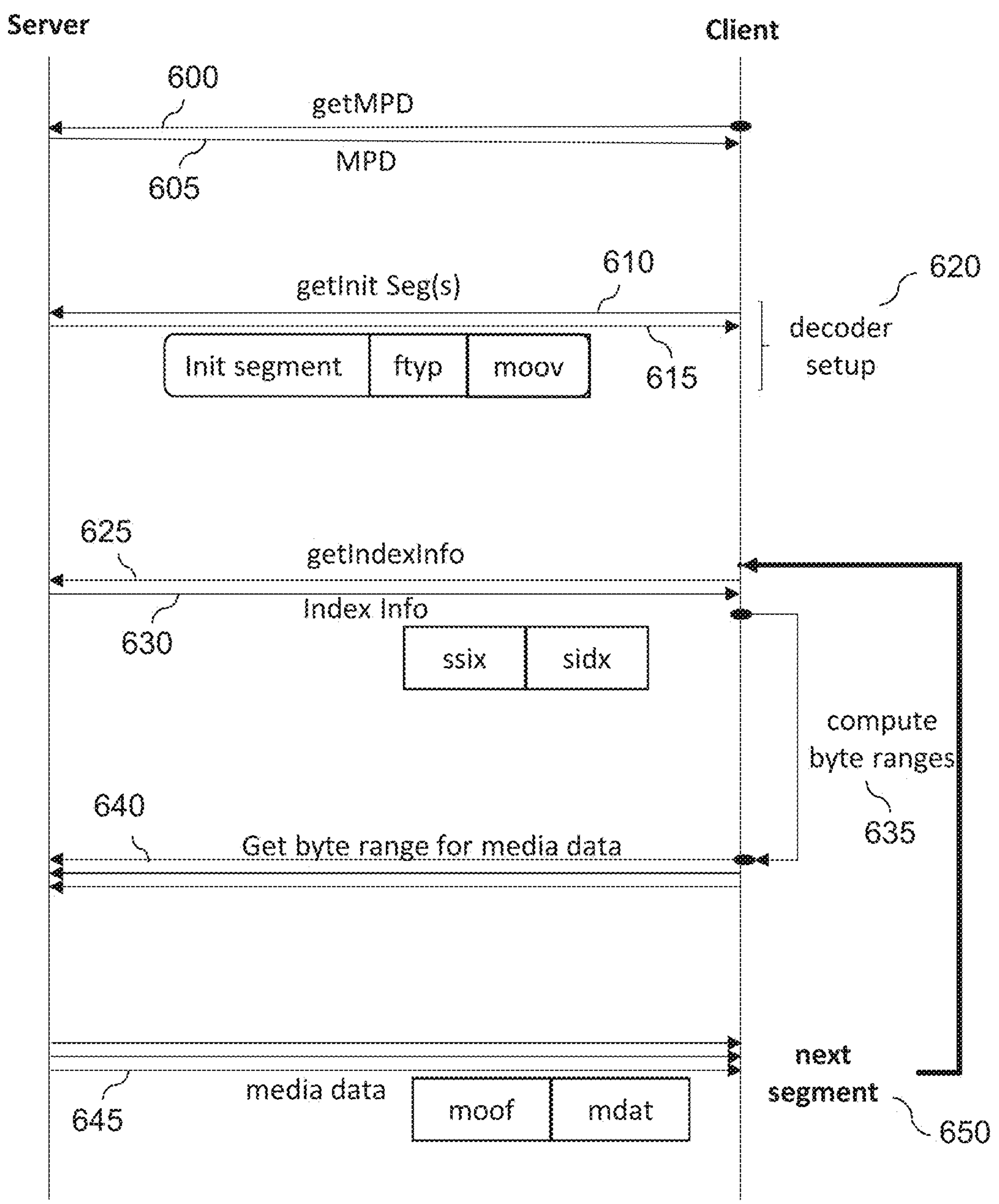
FIG. 6 illustrates an example of requests and responses between a server and a client, as performed with DASH or HLS, to obtain media data.

FIG. 6 illustrates an example of requests and responses between a server and a client, as performed with Dynamic Adaptive Streaming over HTTP (DASH) or HTTP Live Streaming (HLS), according to some embodiments of the disclosure, to obtain media data. For the sake of illustration, it is assumed that the media data are encapsulated in ISOBMFF and a description of the media content components (corresponding to encapsulated media data) is available in a DASH Media Presentation Description (MPD), also known as a DASH manifest, or an HLS manifest.

As illustrated, a first request and response (steps 600 and 605) aim at providing the streaming manifest (DASH MPD or HLS manifest) to the client, that is to say the media presentation description. From the manifest, the client may determine the initialization segments that are required to set up and initialize its decoder(s).

Next, the client requests one or several of the initialization segments identified according to the selected media content components through HTTP requests (step 610). The server replies with metadata (step 615), typically the ones available in the ISOBMFF 'moov' box and its sub-boxes and optionally with some index information. The index information may correspond to a SegmentIndex box 'sidx' and optionally an associated sub-segment index box 'ssix' according to some embodiments of the disclosure, as described hereafter.

In an alternative, the index information may correspond to one or several 'moof' boxes. The index information may also comprise a sample dependency description entry or box 'sdep' according to some embodiments of the disclosure, as described above. In another alternative, the index information may comprise a SegmentIndex box 'sidx', optionally an associated SubsegmentIndexBox 'ssix', a sample dependency description entry or box 'sdep', and optionally a 'moof' box. In another alternative, the index information may comprise a sample dependency description entry or box 'sdep'.

The client does the set-up (step 620) and may request additional index information from the server (step 625). This is the case for example in DASH or HLS profiles where indexed media segments are in use, e.g. live profile. To achieve this, the client may rely on an indication in the manifest (e.g., indexRange), providing the byte range for the index information. When the media content components are encapsulated according to ISOBMFF, the segment index information may correspond to a SegmentIndex box 'sidx' and optionally a sub-segment index box 'ssix' according to some embodiments of the disclosure, as described hereafter.

In an alternative, the segment index information may also comprise a sample dependency description entry or box 'sdep' according to some embodiments of the disclosure as described above and optionally a 'moof' box. In another alternative, the segment index information may comprise a 'moof' box and a sample dependency description entry or box 'sdep' according to some embodiments of the disclosure. In the case according to which the media data are encapsulated according to MPEG-2 TS or when doing broadcast or multicast ABR (i.e., multicast with adaptive bit rate), the indication in the manifest may be a specific URL referencing an Index Segment.

Next, the client receives the requested segment index from the server (step 630). From this index, the client may compute byte ranges (step 635) to request movie fragments or portions of a movie fragment at a given time (e.g. corresponding to a given time range or to a given sample) or corresponding to a given feature of the bit-stream (e.g. a point to which the client can seek (e.g. a random-access point or stream access point), a scalability layer, a temporal sub-layer or a spatial sub-part such as a HEVC tile, a G-PCC tile or VVC subpicture for example). The client may issue one or more requests to get one or more movie fragments or portions of movie fragments (typically portions of data within the Media data box) for the selected media content components in the manifest (step 640). The server replies to the requested data by sending one or more sets of data byte ranges comprising 'moof', 'mdat', boxes, or portions of 'mdat' boxes (e.g., one or more samples) or a combination thereof (step 645). It is observed that the requests for the movie fragments may be made directly without requesting the index, for example when media segments are described as segment template and no index information is available.

Upon reception of the requested data, the client de-encapsulates, optionally decodes, and renders the corresponding media data and prepares the request for the next time interval (step 650). This may consist in getting a new index, even sometimes in getting an MPD update or simply to request next media segments as indicated in the manifest (e.g. following a SegmentList or a SegmentTemplate description).

On one hand, parts of the requested data may be lost or corrupted during transmission, e.g., when doing broadcast or multicast adaptive bit rate (ABR), therefore the received data may be filtered or repaired by the client or parser upon reception. On the other hand, parts of data to be transmitted may be filtered by the server before transmission, e.g., when the available network bandwidth is not sufficient. The behaviour of the server and client are further described with reference to FIGS. 7 and 8.

Figure 7:
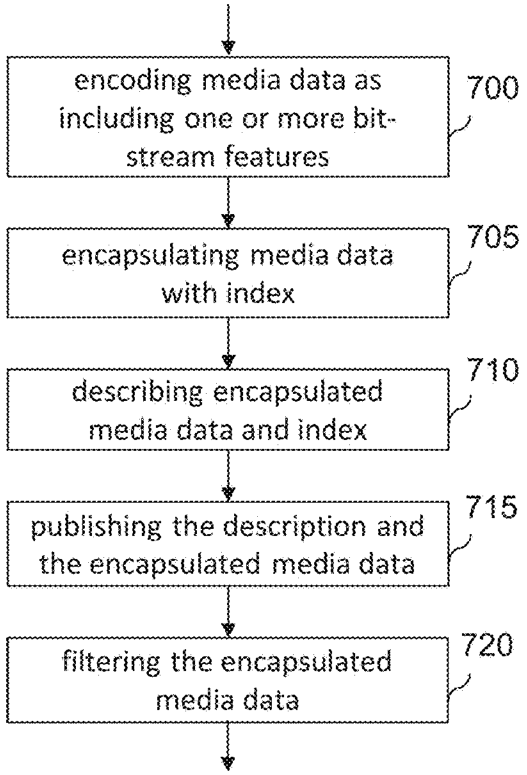
FIG. 7 is a block diagram illustrating an example of steps carried out by a server to transmit data to a client, according to some embodiments of the disclosure.

FIG. 7 is a block diagram illustrating an example of steps carried out by a server or file writer to encapsulate and transmit media data to a client, according to some embodiments of the disclosure.

As illustrated, a first step (step 700) is directed to encoding media data as including one or more bit-stream features (e.g., points to which the client can seek (i.e., random-access points or stream access points), scalability layers, temporal sub-layers, and/or spatial sub-parts such as HEVC tiles, G-PCC tiles or VVC sub-pictures). According to some embodiments, multiple alternatives of the encoded media data may be generated, for example in terms of quality, resolution, etc. The encoding step results in bit-streams that are encapsulated (step 705). It is noted that the encoding step 700 is optional and media data can be obtained and encapsulated without being first encoded. The encapsulation step comprises generating structured boxes containing metadata describing the placement and timing of the media data. The encapsulation step (705) may also comprise generating indexes to make it possible to access sub-parts of the media data (e.g., by using an optional 'sidx' box, an optional 'ssix' box according to an embodiment of the disclosure as described hereafter, a sample group with grouping type 'sdep' or a full box 'sdep' as described above, and optionally a 'leva' box). Alternatively, the index information may simply comprise a movie fragment box 'moof' including a sample group with grouping type 'sdep' or a full box 'sdep'.

According to some embodiments of the disclosure, in order to allow a client or reader filtering, repairing, and/or reconstructing a valid media file compliant with ISOBMFF from incomplete partial sub-segments or incomplete portions of a media file due to losses or corruption during transmission, a server or file writer optionally describes partial sub-segments by defining a SubsegmentIndexBox 'ssix' and assigning 'ssix' level values. The server or file writer describes all the dependencies (inter-track and/or intra-track) of each sample in a track using a sample group with grouping type 'sdep' or a full box 'sdep' according to the disclosure. The timing and the offsets of each sample in the track is also described in corresponding movie fragment boxes 'moof'.

For instance, the server or file writer may determine the intra-track and/or inter-track dependencies for samples carrying slice-based video coding data as follows:

1. for each slice of the sample being described, it determines the Picture Order Count (POC) of the set of reference pictures present in the reference picture lists (e.g., for VVC bit-stream, it consists in parsing and decoding the Reference picture list structure syntax (ref_pic_list_struct). For other codecs, it exists similar data structures listing the reference pictures);
2. for each reference picture of the reference pictures lists:
    a. it determines the number of the sample (the dependent sample) with a POC equal to reference's POC;
    b. it computes the difference (diff_value) between the sample number of the sample being described and the dependent sample;
    c. if the sample is within the same track as the sample being described:
        i. it increments the value of num_dependencies; and
        ii. it sets depended_sample_num_diff equal to the difference (diff_value);
    d. if the sample is within another track than the sample being described:
        i. it increments the value of num_inter_dependencies; and
        ii. it sets depended_inter_sample_num_diff equal to the difference (diff_value).

Once the indexing of the one or more media files or media segments resulting from the encapsulation step has been performed, the one or more media files or media segments are described in a streaming manifest (step 710), for example in a DASH MPD or HLS manifest. Next, the media files or segments with their description are published on a streaming server for diffusion to clients (step 715).

At step 720, while the server is transmitting the media files, segments, or portions thereof, to the client, the server may filter the transmitted encapsulated media data to remove some samples, for example depending on the available bandwidth. The server may use items of information from the sample dependency description in the sample group with group type 'sdep' or the full box 'sdep' to skip some of the samples that are not required by samples that will be transmitted.

It is noted that a file writer may only carry out steps 700 and 705 to produce encapsulated media data and save them on a storage device.

Figure 8:
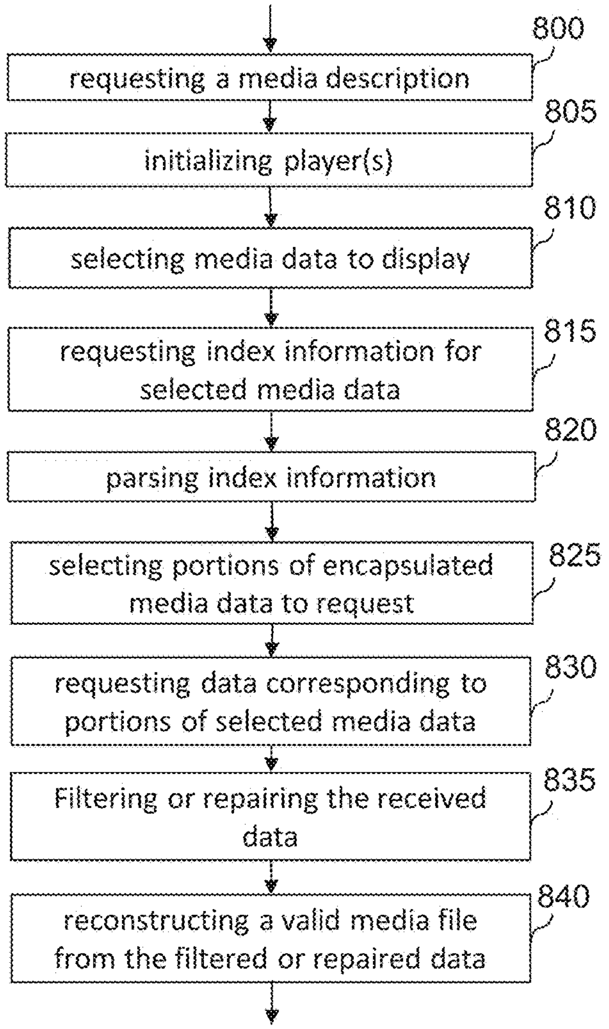
FIG. 8 is a block diagram illustrating an example of steps carried out by a client to obtain data from a server according to some embodiments of the disclosure; and, FIG. 9 schematically illustrates an example of a processing device configured to implement at least one embodiment of the present disclosure.

FIG. 8 is a block diagram illustrating an example of steps carried out by a client to obtain data from a server, according to some embodiments of the disclosure.

As illustrated, a first step is directed to requesting and obtaining a media presentation description or streaming manifest (step 800). Next, the client gets initialization information (e.g., the initialization segments) from the server and initializes its player(s) and/or decoder(s) (step 805) by using items of information of the obtained media description and initialization segments.

Next, the client selects one or more media content components (or encapsulated media data) to play from the media description (step 810) and requests information on these media content components, for example index information (step 815) including for instance an optional 'sidx' box, an optional 'ssix' box, and a sample group with grouping type 'sdep' or a full box 'sdep' according to some embodiments of the disclosure, and optionally a 'leva' box. Alternatively, the index information may simply comprise a movie fragment box 'moof' including a sample group with grouping type 'sdep' or a full box 'sdep'.

Next, after having parsed received index information (step 820), the client may select byte ranges for data to request (i.e. partial sub-segments or byte-ranges), corresponding to portions of the selected media content components (step 825). In order to be able to reconstruct a valid media file from the selected partial sub-segment, the client also selects all partial sub-segments or byte-ranges the selected partial sub-segment or byte-range is depending on as signaled by levels in 'ssix' box or signaled by sample dependencies described in a sample group with grouping type 'sdep' or full box 'sdep' according to the disclosure. Next, the client issues requests for the data that are actually selected (step 830).

As described by reference to FIG. 6, this may be done in one or more requests and responses between the client and a server, depending on the index used during the encapsulation and the level of description in the media presentation description.

It is noted that a reader or file parser may only conduct steps 805 to 825 to access portions of data from an encapsulated media data located on a local storage device.

At step 835, in case of losses or corruption during the transmission, the client, reader, or file parser may filter all the samples that depend on lost or corrupted samples using the sample dependency description in the sample group with group type 'sdep' or the full box 'sdep'. Samples offsets information from the movie fragment box can be used to determine the samples that correspond to lost or corrupted byte-ranges in the received data. Alternatively, the client, reader, or file parser may try to repair some of the lost or corrupted samples depending on the number of importance of samples that depend on them using well-known error concealment technics.

Next, the client, reader, or file parser may reconstruct a media file compliant with ISOBMFF from the requested data by concatenating contiguous requested data in the order of their byte ranges (step 840). If two requested data in byte range order are not contiguous in byte ranges, then the missing data between the non-contiguous requested data are replaced with 0 (zero). In addition, samples overlapping any missing byte range are removed.

According to some embodiments of the disclosure, a default level assignment is defined in the case where the LevelAssignmentBox 'leva' is not defined while when SubsegmentIndexBox 'ssix' is used (it being recalled that the current ISOBMFF specification does not mandate the presence of the LevelAssignmentBox 'leva' when SubsegmentIndexBox 'ssix' is used, and production files already exist in the industry that don't use the LevelAssignmentBox 'leva' with SubsegmentIndexBox 'ssix'). The default level assignment may be defined as follows:

- Level 0 indicates that the byte range contains exactly one or more file-level boxes (e.g. MovieFragmentBox 'moof') other than a media data container box (e.g. MediaDataBox 'mdat' or IdentifiedMediaDataBox 'imda'),
- Level 1 indicates that the data is independently decodable (SAP 1, 2, or 3) and may start with a MovieFragmentBox 'moof', and only the first preceding byte range with level 0, if present, is required to process the data, and
- Level N, with N>1, indicates other data and requires data from the preceding byte ranges with lower levels (level N-1 and below) to be processed. The last occurring preceding byte range with level 0, if present, and the last occurring preceding byte range with level 1 are required to process a byte range with level N>1.

When LevelAssignmentBox 'leva' is absent, non-contiguous byte ranges for a same level may exist in the SubsegmentIndexBox 'ssix'.

Accordingly, a SubsegmentIndexBox 'ssix' with above default level assignment may be advantageously combined with a sample group or full box 'sdep', without defining a LevelAssignmentBox 'leva', e.g. for on-demand or non low-latency live cases, to provide a fine and exhaustive description of dependencies of samples comprised in the byte-ranges, portions, or partial sub-segments of a media file assigned to a level N with N>1.

Figure 9:
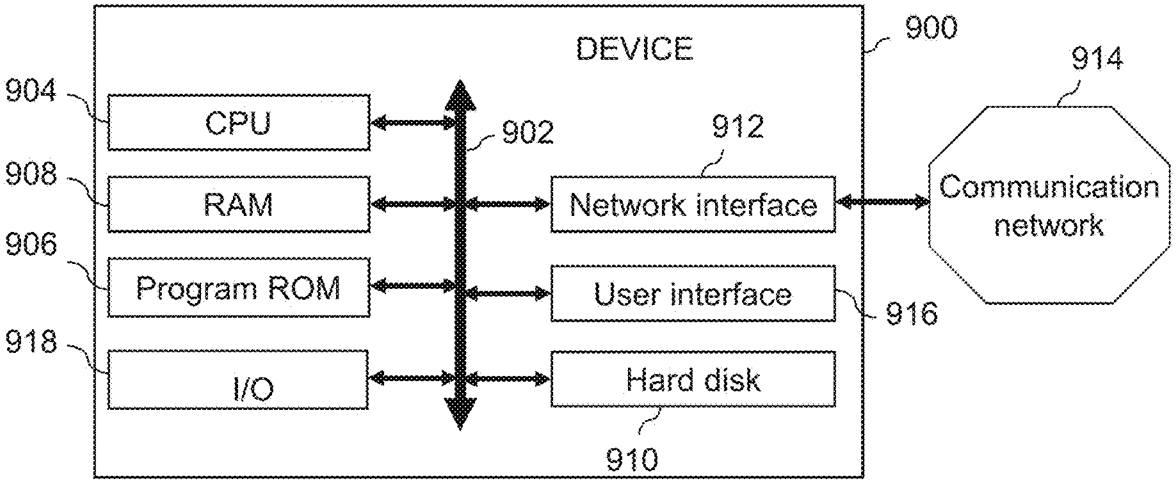

FIG. 9 is a schematic block diagram of a computing device 900 for implementation of one or more embodiments of the disclosure. The computing device 900 may be a device such as a micro-computer, a workstation, or a light portable device. The computing device 900 comprises a communication bus 902 connected to:

- a central processing unit (CPU) 904, such as a microprocessor;
- a random access memory (RAM) 908 for storing the executable code of the method of embodiments of the disclosure as well as the registers adapted to record variables and parameters necessary for implementing the method for encapsulating, indexing, de-encapsulating, and/or accessing data, the memory capacity thereof can be expanded by an optional RAM connected to an expansion port for example;
- a read only memory (ROM) 906 for storing computer programs for implementing embodiments of the disclosure;
- a network interface 912 that is, in turn, typically connected to a communication network 914 over which digital data to be processed are transmitted or received.

The network interface 912 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 904;

a user interface (UI) 916 for receiving inputs from a user or to display information to a user;

a hard disk (HD) 910; and/or an I/O module 918 for receiving/sending data from/to external devices such as a video source or display.

The executable code may be stored either in read only memory 906, on the hard disk 910 or on a removable digital medium for example such as a disk. According to a variant, the executable code of the programs can be received by means of a communication network, via the network interface 912, in order to be stored in one of the storage means of the communication device 900, such as the hard disk 910, before being executed.

The central processing unit 904 is adapted to control and direct the execution of the instructions or portions of software code of the program or programs according to embodiments of the disclosure, which instructions are stored in one of the aforementioned storage means. After powering on, the CPU 904 is capable of executing instructions from main RAM memory 908 relating to a software application after those instructions have been loaded from the program ROM 906 or the hard-disc (HD) 910 for example. Such a software application, when executed by the CPU 904, causes the steps of the flowcharts shown in the previous figures to be performed.

In this embodiment, the apparatus is a programmable apparatus which uses software to implement the disclosure. However, alternatively, the present disclosure may be implemented in hardware (for example, in the form of an Application Specific Integrated Circuit or ASIC).

Although the present disclosure has been described herein above with reference to specific embodiments, the present disclosure is not limited to the specific embodiments, and modifications will be apparent to a person skilled in the art which lie within the scope of the present disclosure.

Many further modifications and variations will suggest themselves to those versed in the art upon making reference to the foregoing illustrative embodiments, which are given by way of example only and which are not intended to limit the scope of the disclosure, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of encapsulating media data in a media file, in a processing device, the media data comprising a plurality of samples, the method comprising:

generating a first track comprising a media data part storing a first sequence of samples of the plurality of samples, the first track further comprising a metadata part describing the first sequence of samples, generating descriptive metadata describing a dependency between a given sample of the first track and another sample, the generated descriptive metadata being stored in the metadata part of the first track, and encapsulating the first track in the media file wherein the generated descriptive metadata comprise an indication for indicating that an offset is to be used for identifying the sample the given sample depends on, the offset representing a relative difference between sample identifiers within the first track.

2. The method of claim 1, wherein the reference sample is a previously identified reference sample.

3. The method of claim 1, further comprising generating a second track comprising a media data part storing a second sequence of samples of the plurality of samples, the generated descriptive metadata describing a dependency between a given sample of the first track and a sample of the second track.

4. The method of claim 3, wherein the generated descriptive metadata comprise a reference to the second track and an offset representing a relative difference between identifiers of the sample of the second track relative to a sample of the second track temporally corresponding to the given sample.

5. The method of claim 1, wherein the generated descriptive metadata describes a group of samples, a sample of the first track that depends on another sample being associated with the described group of samples.

6. The method of claim 1, wherein the generated descriptive metadata further comprises a number of samples, in other tracks on which a given sample of the first track depends.

7. The method of claim 1, wherein the generated descriptive metadata further comprise an indicator indicating that the given sample depends on a same sample a previous sample depends on.

8. The method of claim 1, wherein the media file is an ISOBMFF media file.

9. A method for processing a media file encapsulating media data, in a processing device, the media data comprising a plurality of samples, the method comprising:

obtaining descriptive metadata of a meta data part of a first track encapsulated in the media file, the first track further comprising a media data part storing a first sequence of samples of the plurality of samples, the obtained descriptive metadata describing a dependency between a given sample of the first track and another sample, processing the given sample as a function of the described dependency, wherein the obtained descriptive metadata comprise an indication for indicating that an offset is to be used for identifying the sample the given sample depends on, the offset representing a relative difference between sample identifiers within the first track.

10. The method of claim 9, wherein the offset is a difference between an identifier of a sample used as reference and an identifier of the sample the given sample depends on.

11. The method of claim 9, wherein the media file comprises a second track, the second track comprising a media data part storing a second sequence of samples of the plurality of samples, the obtained descriptive metadata describing a dependency between a given sample of the first track and a sample of the second track.

12. The method of claim 11, wherein the obtained descriptive metadata comprise a reference to the second track and an offset representing a relative difference between identifiers of the sample of the second track relative to a sample of the second track temporally corresponding to the given sample.

13. The method of claim 9, wherein the obtained descriptive metadata describes a group of samples, a sample of the first track that depends on another sample being associated with the described group of samples.

14. The method of claim 9, wherein processing a given sample depending on another sample comprises filtering samples.

15. The method of claim 9, wherein processing a given sample depending on another sample comprises repairing a damage or partially lost byte range of the media file.

16. The method of claim 9, wherein the media file is an ISOBMFF media file.

17. A non-transitory computer-readable storage medium storing instructions of a computer program for implementing the method according to claim 1.

18. A processing device comprising a processing unit configured for carrying out each step of the method according to claim 1.

19. The method of claim 1, wherein the offset is a difference between an identifier of a sample used as reference and an identifier of the sample the given sample depends on.

20. The method of claim 19, wherein the reference sample is the given sample.

21. The method of claim 19, wherein the reference sample is an immediately preceding sample, without any dependency, of the given sample.

22. The method of claim 10, wherein the reference sample is a previously identified reference sample.

23. The method of claim 10, wherein the reference sample is the given sample.

24. The method of claim 10, wherein the reference sample is an immediately preceding sample, without any dependency, of the given sample.

* * * * *